United States Patent
Sakurai et al.

(10) Patent No.: US 7,736,725 B2
(45) Date of Patent: Jun. 15, 2010

(54) LAMINATE FILM FOR ELECTROPHOTOGRAPHY, INFORMATION RECORDING MEDIUM USING THE SAME, AND METHOD FOR PRODUCING THE INFORMATION RECORDING MEDIUM

(75) Inventors: Kunio Sakurai, Ashigarakami-gun (JP); Tomoo Kobayashi, Minamiashigara (JP); Kaoru Torikoshi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 58 days.

(21) Appl. No.: 12/222,031

(22) Filed: Jul. 31, 2008

(65) Prior Publication Data

US 2008/0311356 A1 Dec. 18, 2008

Related U.S. Application Data

(62) Division of application No. 11/251,921, filed on Oct. 18, 2005, now Pat. No. 7,413,795.

(30) Foreign Application Priority Data

Jun. 30, 2005 (JP) ............................... 2005-192178

(51) Int. Cl.
*B32B 7/06* (2006.01)
(52) U.S. Cl. ..................... 428/202; 428/204; 428/207; 428/220; 428/323; 428/336; 428/913.3; 430/124.1; 430/125.3; 430/126.1
(58) Field of Classification Search ............ 428/202, 428/204, 207, 220, 323, 336, 913.3; 430/124.1, 430/125.3, 126.1
See application file for complete search history.

(56) References Cited

U.S. PATENT DOCUMENTS

| | | | | |
|---|---|---|---|---|
| 5,885,698 | A | * | 3/1999 | Takehana et al. ............. 428/212 |
| 7,070,860 | B2 | | 7/2006 | Kobayashi et al. |
| 7,413,795 | B2 | * | 8/2008 | Sakurai et al. ............. 428/195.1 |
| 2003/0207089 | A1 | | 11/2003 | Nakamura et al. |
| 2003/0224169 | A1 | * | 12/2003 | Kobayashi et al. ........... 428/408 |
| 2004/0126690 | A1 | | 7/2004 | Kobayashi et al. |
| 2004/0161690 | A1 | * | 8/2004 | Sakurai et al. ............. 430/124 |
| 2006/0216497 | A1 | * | 9/2006 | Torikoshi et al. ............. 428/323 |

FOREIGN PATENT DOCUMENTS

| | | |
|---|---|---|
| JP | A-10-86562 | 4/1998 |
| JP | A-11-334265 | 12/1999 |
| JP | A-2001-92255 | 4/2001 |
| JP | A-2003-330213 | 11/2003 |
| JP | A-2004-12575 | 1/2004 |
| JP | A-2004-20950 | 1/2004 |
| JP | A-2004-191707 | 7/2004 |
| JP | A-2004-240393 | 8/2004 |
| JP | A-2005-4029 | 1/2005 |
| JP | A-2005-4030 | 1/2005 |

* cited by examiner

*Primary Examiner*—Betelhem Shewareged
(74) *Attorney, Agent, or Firm*—Oliff & Berridge, PLC

(57) ABSTRACT

The present invention provides a laminate film for electrophotography including a substrate, a laminate layer formed on one surface of the substrate, and a non-laminate layer formed on the other surface of the substrate, wherein the non-laminate layer contains at least a resin and fine particles and satisfies the inequalities (1) $1.5 \leq R \leq 5$; (2) $0.1 \leq t < R$; and (3) $7/R \leq n$, wherein R represents a volume average particle diameter (μm) of the fine particles; t represents a thickness (μm) of the non-laminate layer; and n represents the number of the fine particles contained in the non-laminate layer per 10,000 square μm in the substrate plane direction (particles/$(100\,\mu m)^2$).

11 Claims, 2 Drawing Sheets

LAMINATE FILM FOR ELECTROPHOTOGRAPHY, INFORMATION RECORDING MEDIUM USING THE SAME, AND METHOD FOR PRODUCING THE INFORMATION RECORDING MEDIUM

CROSS-REFERENCE TO RELATED APPLICATION

This application claims priority under 35 USC 119 from Japanese Patent Application No. 2005-192178, the disclosure of which is incorporated by reference herein.

This is a Division of application Ser. No. 11/251,921 filed Oct. 18, 2005, which claims the benefit of Japanese Application No. 2005-192178 filed Jun. 30, 2005. The disclosure of the prior applications is hereby incorporated by reference herein in its entirety.

BACKGROUND OF THE INVENTION

1. Field of the Invention

The present invention relates to a laminate film for electrophotography for easy production of an information recording medium using an image-recorded medium printed by an electrophotographic method, an information recording medium using the laminate film, and a manufacturing method of the information recording medium. More specifically, the present invention relates to a laminate film for electrophotography, an information recording medium using the same, and a method for manufacturing the information recording medium, which laminate film can be used for non-contact or contact type information recording media containing personal image information such as facial-photograph-containing cash cards, employee identification cards, student identification cards, individual membership cards, resident identification cards, various types of driver's licenses and various types of qualification certificates, RFID tags, image-recorded sheets for personal identification used in medical settings, image display boards, indication labels, and the like.

2. Description of the Related Art

In recent years, image formation technology has developed, and means are known which can form images of the same quality in large quantities at low cost by various printing methods, such as intaglio printing, letterpress printing, planographic printing, gravure printing, and screen printing. Such printing methods are also widely used for manufacturing an information recording medium which can store predetermined information and communicate with an external device in a contact or non-contact manner, such as an IC card, a magnetic card, an optical card, and a card which is a combination thereof.

However, for example, the above-mentioned screen printing requires a lot of printing plates corresponding to the number of images to be printed. In the case of color printing, the required printing plates are further increased corresponding to the number of colors. Therefore, these printing methods are not suitable for individual pieces of personal identification information (including facial photographs, names, addresses, dates of birth, various licenses, and the like).

In response to the above-mentioned problem, the most dominant image formation means currently used is an image formation method based on a printer or the like which employs a sublimation-type or melting-type heat-transfer method using an ink ribbon, or the like. However, while such means can easily print personal identification information, they still have a problem in that increase in the printing speed lowers the resolution, and increase in the resolution leads to decrease in the printing speed.

In image formation (printing) by the electrophotographic method, the surface of an image carrier is electrically charged uniformly, and then subjected to light exposure according to image signals, to form an electrostatic latent image based on the difference in potential between the exposed portion and the unexposed portion. Thereafter, electrostatic development is conducted with a color powder (an image forming material) called toner with the opposite polarity to (or with the same polarity as) that of the charge of the image carrier, thereby forming a visible image (a toner image) on the surface of the image carrier. In the case of a color image, the color image is created by repetition of this process plural times or by processes conducted by plural image formation units disposed in parallel to form a color visible image wherein the color visible image is transferred to an image recording medium and fixed (immobilization, in other words, melting of the color powder mainly by heat followed by solidification thereof by cooling).

Since an electrophotographic method electrically forms an electrostatic latent image on the surface of an image carrier by an image signal as mentioned above, not only can the method form the same image repeatedly but also can easily form a different image. Moreover, a toner image formed on the surface of an image carrier can be substantially completely transferred to the surface of an image recording medium, and the toner image slightly remaining on the surface of the image carrier can be easily removed by a resin blade, a brush or the like. Accordingly, printed materials can be easily prepared for limited production of a wide variety of goods.

In addition, the above-mentioned toner is generally formed by fusing and mixing a thermally fusible resin and a pigment, as well as optional additives such as a charge control agent, and then pulverizing and atomizing the kneaded substance. Further, the electrostatic latent image in the electrophotographic method has a considerably higher resolution compared with the above-mentioned atomized toner, and a sufficient resolution on par with the resolutions realized by the screen printing and the heat-transfer method using an ink ribbon can be expected.

Also, a color image can be obtained by using color toners of four primary colors of cyan, magenta, yellow, and black and then mixing the toner images of the respective colors. Theoretically, the same colors as realized in printing can be reproduced. In addition, in the above-mentioned color toner, the toner resin and the pigment can be relatively freely compounded, thereby enabling easy increase in the light shielding property of the image.

There have been almost no studies on the heat resistance and light resistance of information recording media intended to be used outdoors. Particularly when a driver's license or the like is left in a car and exposed to direct sunlight, fading occurs if the image is a heat-transferred image using a dye as a coloring material. However, when a color image is formed by the electrophotographic method, pigments corresponding to the respective colors of cyan, magenta, yellow, and black used in the color toner have excellent light resistance. Therefore, the light resistance of the images formed by the electrophotographic method is considered to be sufficiently high. Likewise, if a heat-resistant toner is selected, the heat resistance of the image formed on an information recording medium is considered to be high enough to allow the information recording medium to be used outdoors.

On the other hand, the most widely used substrates (cores) used for various types of cards are currently polyvinyl chloride sheets. This is because polyvinyl chloride (hereinafter sometimes referred to as "PVC") sheets are excellent in printing characteristics in conventional printing machines, because they are also excellent in suitability for embossing (process to raise or lower characters and the like), and particularly because they are inexpensive compared with other alternate resins.

Although in recent years people have an environmentally negative image of PVC due to the release of dioxins by incineration treatment, it is thought today that the harmful gas release can be suppressed by proper incineration methods and the advancement of incinerators. The PVC resins to be raw materials comprise salts at a ratio of about 60%, and from the standpoint that the petroleum content thereof is low as compared with other resins, they are sometimes thought to be less harmful to the environment than other resins. Further, PVC resins are excellent in recyclability, and material recycling in the field of credit cards is advanced.

If embossing is not carried out in the manufacturing of cards, conventional films such as biaxially stretched PET (polyethylene terephthalate) films can be used. However, in order to retain the functions of conventional cards, embossing is often indispensable. Films currently used for embossing include: ABS resin films and polyolefin resin films, which soften at relatively low temperatures; a modified PET resin film called PETG; and integrally formed films of a modified PET resin film with a PET film, an amorphous PET resin film, or a polycarbonate resin film.

As a method for producing conventional cards using substrates of the above-mentioned various types of cards, a production method including carrying out multi-imposition printing of card designs on large size substrates, layering the substrates so as to adjust the card thickness, sandwiching them with metal plates, piling more than ten of the layered products, heat pressing them at one time under atmospheric pressure followed by cooling, and punching the pressed products into a card size is generally employed.

This method takes several tens of minutes for the heat pressing so as to evenly transmit heat to the center part of the layered products and expel the air remaining between substrates, and takes approximately the same time for cooling.

On the other hand, examples of the above-mentioned various kinds of cards printed by using an electrophotographic apparatus are as follows.

To improve the fixation property and durability of images and prevent forgery and falsification, there is a method proposed (refer to Japanese Patent Application Laid-Open (JP-A) No. 10-86562) which involves forming a hot sealing type adhesive layer of a polyester type on a transparent sheet containing polyethylene naphthalate or polyethylene terephthalate; printing image information for authentication and identification thereon as a mirror image; and sticking an acrylic substrate and the mirror image face to face in a contacting manner (the transparent sheet also works as a protection sheet).

However, with respect to the above-mentioned transparent sheet bearing the adhesive layer, although the fixation property and the transportability are taken into consideration for use in electrophotography, since the sheet is just an insulating sheet for which no particular consideration of the transfer property is taken, there are cases where this results in inferior image quality in an electrophotographic apparatus. Further, since no practical description of the speed and pressure of laminating means is given, even if an image is printed on the transparent sheet, air may possibly remain between the sheets, and the adverse effects of air bubbles sometimes result in inferior image quality.

As another example, to form good images and to prevent forgery, a method has been proposed (refer to JP-A No. 11-334265) which involves printing individual identification information on a light transmitting sheet as a mirror image; and sticking an adhesive layer on a substrate having an IC memory and the mirror image face to face in a contacting manner (the light transmitting sheet also works as a protection sheet).

However, with respect to the light transmitting laminate sheet (and the substrate), there is description that it is preferable to use a biaxial orientation polyester film or ABS or a polyester film/biaxial orientation polyester film for at least a portion of the sheet, and that it may be polyvinyl chloride, and since just a insulating sheet is used without any particular special device, transportation failure may possibly occur in an electrophotographic apparatus and the image quality may possibly become inferior. Also, since there is no practical description of the speed and pressure of laminating means, even if images can be printed on the light transmitting sheet, air may possibly remain between sheets at the time of laminating them, and the effect of the air bubbles remains to result in deterioration of the image quality.

Further, as another example, there is a method proposed (refer to JP-A No. 2001-92255) which involves printing an invisible bar code as well as various kinds of individual information on a 250 μm-thick polyvinyl chloride sheet or a 280 μm-thick polyester sheet by an electrophotographic method; overlaying a 250 μm-thick polyvinyl chloride over film or a 100 μm-thick polyester vinyl over film on the printed surface; and laminating by a heat press.

However, with respect to the above-mentioned polyvinyl chloride sheet or polyester sheet, since just an insulating sheet is used without any particular special device, transportation failure may possibly occur in an electrophotographic apparatus, and the image quality may possibly become inferior. Further, since there is no practical description of the temperature, pressure and time of the heat press apparatus, even if images can be printed on the sheet, air may possibly remain between the above-mentioned sheets and the over films and between the over films and a press member of the heat press apparatus at the time of laminating them, and the effect of the air bubbles remains to result in deterioration of the image quality and glossiness.

Further, as another example, to suppress glare of a non-laminate surface of a substrate, a laminate film for electrophotography has been proposed (refer to JP-A No. 2004-12575) which has a gloss control layer provided on the non-laminate surface, wherein the gloss control layer contains a binder (polyester resins or the like) and a filler (fine particles=mat agents) and has a thickness in a range of 0.01 to 20 μm (more preferably 0.1 to 5 μm), a volume average particle diameter of the filler is in a range of 0.1 to 10 μm (more preferably 1 to 5 μm), and the weight ratio of the filler and the binder (filler:binder) is in a range of (0.3:1) to (3:1), as well as an image recording medium having a gloss control layer almost same as that of the laminate film for electrophotography and an image display body using the medium (refer to JP-A No. 2004-20950).

With respect to the above-mentioned laminate films for electrophotography, the non-laminate layers are previously subjected to mat treatment to control the surface gloss of the non-laminate surfaces after the laminate films for electrophotography and core substrates are laminated. However, at the time of laminating the laminate films for electrophotography and the core substrates, air may possibly remain between the laminate films for electrophotography and a press member of a heat press apparatus, and the effect of the air bubbles remains to result in deterioration of the gloss quality.

As described above, in the case of using conventional laminate films for electrophotography, air remains between the layered members to result in deterioration of the gloss and image quality.

However, these problems may be often solved if the layered products obtained by layering the substrates constituting the cards as described above are heat pressed slowly taking sufficient time of about several tens of minutes at the time of heat pressing. On the other hand, the heat pressing taking such a long time considerably lowers productivity. Therefore, in terms of productivity, the heat pressing is preferably completed within as short a time as possible.

Accordingly, it is thought that it is easy to improve the productivity in the case where a layered product has a thin thickness since heat can promptly be transmitted to the center part of the layered product. However, since the time taken to sufficiently expel air remaining between substrates is independent of the thickness of the layered product and thus not practically changed, the productivity cannot be improved even if heat pressing is carried out while the thickness of the layered product is made thin.

Further, if the heat press time is forcibly shortened, lamination is completed before the air remaining between substrates is sufficiently removed to leave air bubbles between the substrates. Dent traces (dimple patterns like the surface of a golf ball) of air remaining appear on the outermost surface of the substrate contacting a metal plate utilized for heat pressing to result, in particular, in considerable deterioration of the finished gloss quality of cards.

SUMMARY OF THE INVENTION

The present invention has been made in view of the above circumstances and provides a laminate film for electrophotography in which formation of traces of air accumulation like dimple patterns on a non-laminate surface is prevented in the case of producing an information recording medium by laminating a laminate film for electrophotography in which an image is recorded on a surface to be laminated and a core substrate sheet for a card at approximately atmospheric pressure within a short time, an information recording medium using the same and excellent in finished image quality (particularly gloss quality) and productivity, and a production method of such an information recording medium.

A first aspect of the invention provides a laminate film for electrophotography comprising a substrate, a laminate layer formed on one surface of the substrate, and a non-laminate layer formed on the other surface of the substrate, wherein the non-laminate layer contains at least a resin and fine particles and satisfies the following inequalities (1) to (3):

$1.5 \leq R \leq 5$;  inequality (1)

$0.1 \leq t < R$; and  inequality (2)

$7/R \leq n$,  inequality (3)

wherein R represents a volume average particle diameter (μm) of the fine particles; t represents a thickness (μm) of the non-laminate layer; and n represents the number of the fine particles contained in the non-laminate layer per 10,000 square μm in the substrate plane direction (particles/(100 μm)$^2$).

A second aspect of the invention provides an information recording medium comprising a core substrate sheet for a card and a laminate layer bonded to at least one surface of the core substrate sheet for a card, a toner image being formed on a surface of the laminate layer at the core substrate sheet for a card side thereof, wherein the information recording medium is produced at least through a lamination process of laminating the surface of the laminate layer of an image-recorded medium and the at least one surface of the core substrate sheet for a card by heat pressure bonding, wherein the image-recorded medium comprises a substrate, the laminate layer formed on one surface of the substrate, and a non-laminate layer formed on the other surface of the substrate, the toner image being formed on the surface of the laminate layer by use of an electrophotographic method, and wherein the non-laminate layer contains at least a resin and fine particles and satisfies the following inequalities (5) to (7):

$1.5 \leq R \leq 5$;  inequality (5)

$0.1 \leq t < R$; and  inequality (6)

$7/R \leq n$,  inequality (7)

wherein R represents a volume average particle diameter (μm) of the fine particles; t represents a thickness (μm) of the non-laminate layer; and n represents the number of the fine particles contained in the non-laminate layer per 10,000 square μm in the substrate plane direction (particles/(100 μm)$^2$).

A third aspect of the invention provides a method for producing an information recording medium, comprising at least a lamination process of laminating a surface of a laminate layer of an image-recorded medium and at least one surface of a core substrate sheet for a card by heat pressure bonding, wherein the image-recorded medium is obtained by forming a toner image on the surface of the laminate layer of a laminate film for electrophotography by use of an electrophotographic method, the laminate film for electrophotography comprising a substrate, the laminate layer formed on one surface of the substrate, and a non-laminate layer formed on the other surface of the substrate, and wherein the non-laminate layer contains at least a resin and fine particles and satisfies the following inequalities (8) to (10):

$1.5 \leq R \leq 5$;  inequality (8)

$0.1 \leq t < R$; and  inequality (9)

$7/R \leq n$,  inequality (10)

wherein R represents a volume average particle diameter (μm) of the fine particles; t represents a thickness (μm) of the non-laminate layer; and n represents the number of the fine particles contained in the non-laminate layer per 10,000 square μm in the substrate plane direction (particles/(100 μm)$^2$).

DETAILED DESCRIPTION OF THE INVENTION

Laminate Film for Electrophotography

Figure 1:
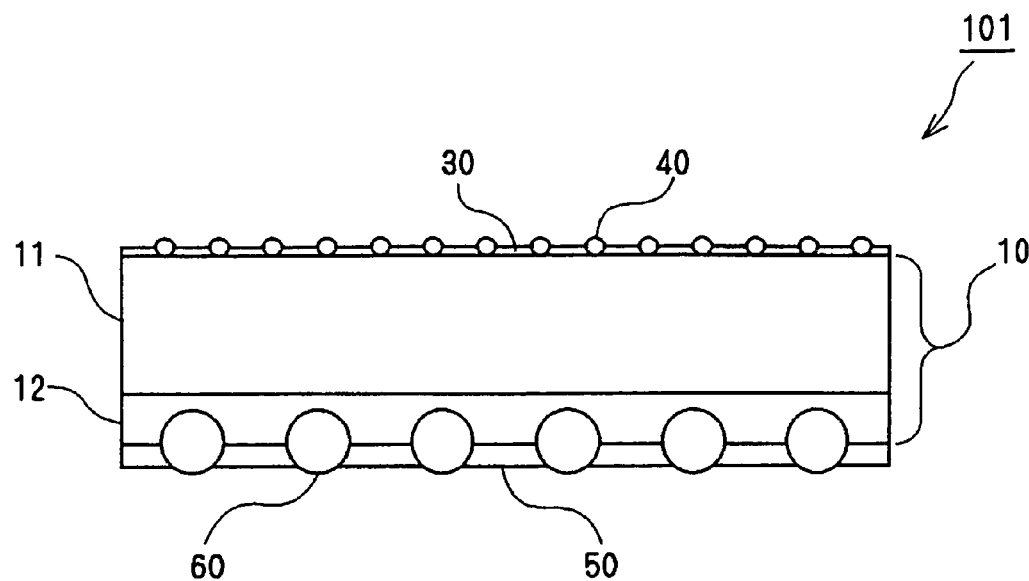
FIG. 1 is a schematic cross-sectional view showing one example of a laminate film for electrophotography of the invention.

The laminate film for electrophotography of the present invention comprises a substrate, a laminate layer formed on one surface of the substrate, and a non-laminate layer formed on the other surface of the substrate and is characterized in that the non-laminate layer contains at least a resin and fine particles and satisfies the following inequalities (1) to (3):

$1.5 \leq R \leq 5$;  inequality (1)

$0.1 \leq t < R$; and  inequality (2)

$7/R \leq n$,  inequality (3)

wherein R represents a volume average particle diameter (μm) of the fine particles; t represents a thickness (μm) of the non-laminate layer; and n represents the number of the fine particles contained in the non-laminate layer per 10,000 square μm in the substrate plane direction (particles/(100 μm)$^2$).

According to the invention, in the case of producing an information recording medium by laminating a laminate film for electrophotography in which an image is recorded on the laminate surface side (an image-recorded medium) and a core substrate sheet for a card at approximately atmospheric pressure (approximately atmospheric pressure means within a range of 10,000 to 101,325 Pa) within a short time, a laminate film for electrophotography in which formation of traces of air accumulation like dimple patterns on the non-laminate surface can be suppressed can be provided. Further, the information recording medium produced by using the laminate film for electrophotography of the invention is excellent in finished image quality (particularly gloss quality), and upon producing the information recording medium, since the heat press bonding treatment at the time of lamination can be carried out within a shorter time than before, productivity is excellent.

It is considered that such effects can be achieved since air is efficiently released promptly from the interface between the non-laminate layer and a plate in contact with the layer (hereinafter, referred to as a heat press plate) which is made of a metal or the like and is in a lamination apparatus.

That is, it is considered that if the above-mentioned inequalities (1)-(3) are satisfied, portions of the fine particles having a prescribed size form projected parts at the surface of the non-laminate layer and owing to the existence of the projected parts at a prescribed density, when the non-laminate layer and the heat press plate are brought into contact with each other at the time of lamination, the regions where no projected part is formed on the non-laminate layer surface and the heat press plate are not brought into contact with each other and air is thus not closed in, whereby air existing between them easily escapes to the outside during the heat press bonding.

Further, since occurrence of the air accumulation traces like the dimple patterns on the non-laminate layer can be suppressed, the non-laminate layer can be finished to have high gloss, and it is thus easy to obtain gloss of more than 40% on the basis of 75° specular gloss.

In addition, the fine particles in the non-laminate layer have a function of providing good slippage between the non-laminate layer surface and another surface contacting the layer surface, so that a good transportation property can be assured in an electrophotographic recording apparatus.

To control the gloss, laminate films for electrophotography disclosed in JP-A Nos. 2004-12575 and 2004-20950 can be exemplified as laminate films for electrophotography having fine particles (so-called mat agent) in a non-laminate layer. Although the laminate films for electrophotography are expected to have similar effects as those of the invention since they contain fine particles in the non-laminate layers, in a case where the laminate films for electrophotography are subjected to lamination treatment within a short time, air accumulation traces like dimple patterns are formed on the non-laminate surfaces. This is thought to be because of the following reasons.

First, in the above-mentioned conventional laminate films for electrophotography, the fine particles are used for roughening the non-laminate layer surface and suppressing glare (suppress the glare to about 40% or less on the basis of 75° specular gloss) on the non-laminate surfaces. Therefore, as compared with the non-laminate layer of the laminate film for electrophotography of the invention, the non-laminate layers of the conventional laminate films for electrophotography contain fine particles in a manner such that cyclic and continuous and dense projected and recessed parts are formed so as to cause light diffusion on the surfaces. That is, as compared with the laminate film for electrophotography of the invention, it is required for the fine particles to be smaller in particle diameter and to exist at higher existence density per unit of surface area.

Accordingly, as compared with the laminate film for electrophotography of the invention, when the non-laminate layer surface and the heat press plate are brought into contact with each other at the time of lamination, there is a greater tendency for surface contact than that for point contact. Therefore, it becomes easy to enclose air between the non-laminate layer surface and the heat press plate, and the air cannot easily escape to the outside promptly during the heating and pressure bonding process.

Hereinafter, the constituent materials and constitution of the laminate film for electrophotography of the invention will be described in more detail.

<Substrate (for Laminate Film for Electrophotography)>

As a substrate, resin films using conventionally known resins can be used, and those containing polyethylene terephthalate (PET) resin as a main component are preferable. The substrate may be made of PET resin and may further contain a polyester resin obtained by copolymerization of at least ethylene glycol, terephthalic acid, and 1,4-cyclohexanedimethanol (hereinafter, abbreviated as PETG in some cases). In this case, it is preferable to contain the PET resin at least at one surface of the substrate and the PETG resin at the other surface.

In the case where the substrate is composed of a layer containing a PET resin and a layer containing a PETG resin, the laminate layer is preferably formed on the side of the substrate where the layer containing the PETG resin is formed. Accordingly, in the case of forming the laminate layer by applying a coating solution for laminate layer formation to the substrate surface where the layer containing the PETG resin is formed when producing the laminate film for electrophotography, the compatibility of the resin contained in the coating solution and the substrate surface becomes good. Accordingly, the substrate surface containing the PETG resin and the laminate layer formed on the substrate surface are firmly stuck to each other and separation thereof can be prevented. Even if separation occurs, complete separation at the interface portion does not take place. Therefore, forgery can reliably be prevented in the case where the laminate film for electrophotography and the core substrate sheet for a card of the invention are used for producing an information recording medium.

Further, among resins to be used as a substrate, a PETG resin is not only excellent in compatibility with a coating solution to be used for forming the laminate layer but also makes it easy to produce a laminate film for electrophotography and an information recording medium with the laminate film using an already existing apparatus. In addition, as compared with resins conventionally used for materials constituting a substrate, a PETG resin hardly becomes yellowish and is excellent in light fastness to light, e.g. sun light and fluorescent lamp light, to which an information recording medium produced using a laminate film is exposed in common use environments.

The PETG resin may be obtained by copolymerization of at least ethylene glycol, terephthalic acid, and 1,4-cyclohexanedimethanol and may contain other components.

One surface of the substrate may have a releasing property. In this case, the surface of the substrate contains a material having a releasing property. As the material having a releasing property, silicone type hard coating materials can be used and practical examples are a condensate resin containing a silane type composition and mixtures of a condensate resin containing a silane type composition and a colloidal silica dispersion liquid. In the case such a substrate having a releasing property on one surface is used, the laminate layer is preferably formed on the substrate surface having a releasing property.

On the other hand, to improve the adhesion property to the laminate layer and a non-laminate layer to be formed on the surface of the substrate, an organic resin having adhesive and pressure sensitive adhesive properties may be contained in at least one surface of the substrate.

<Non-Laminate Layer>

The non-laminate layer is not particularly limited as long as it contains a resin and fine particles and may further contain, according to necessity, various kinds of additives such as a charge controlling agent or the like. The resin contained in the non-laminate layer is not particularly limited, however it is preferable to use a polyester resin.

In the case the substrate contains a PET resin, it is preferable to form the non-laminate layer on the surface of the substrate where the PET resin is contained.

Hereinafter, resins (polyester resins) and fine particles for the non-laminate layer will be described.

—Polyester Resin—

In this invention, as a resin contained in the non-laminate layer, polyester resins are particularly preferably used and combinations of the polyester resins and other resins can be used.

The polyester resins to be used for the non-laminate layer of the laminate film for electrophotography of the invention are preferably saturated polyester resins obtained generally by condensation reaction of a polybasic acid having two or more carboxyl groups and a glycol.

As the polybasic acid, for example, an aromatic dicarboxylic acid, which is a dibasic acid, can be used. Examples thereof include terephthalic acid, isophthalic acid, orthophthalic acid, naphthalene dicarboxylic acid, biphenyl dicarboxylic acid, and 1,5-naphthalic acid. In addition, aromatic oxycarboxylic acids such as p-oxybenzoic acid and p-(hydroxyethoxy)benzoic acid, and aromatic tri- and tetra-carboxylic acids such as trimellitic acid and pyromellitic acid, are also usable.

Examples of the aliphatic dicarboxylic acid include succinic acid, adipic acid, sebacic acid, azelaic acid, dodecandioic acid, and dimer acid. Examples of the alicyclic dicarboxylic acid include 1,4-cyclohexane dicarboxylic acid, 1,3-cyclohexane dicarboxylic acid, 1,2-cyclohexane dicarboxylic acid, and anhydrides thereof.

In addition, a dicarboxylic acid having a polymerizable unsaturated double bond can also be used. Such a dicarboxylic acid may be: an α,β-unsaturated dicarboxylic acid such as fumaric acid, maleic acid, maleic anhydride, itaconic acid, or citraconic acid; or an alicyclic dicarboxylic acid containing an unsaturated double bond such as 2,5-norbornene dicarboxylic anhydride or tetrahydrophthalic anhydride. Among these, fumaric acid, maleic acid, itaconic acid, and 2,5-norbornene dicarboxylic anhydride are more preferable.

Further, a hydroxycarboxylic acid may be used such as hydroxypivalic acid, γ-butyrolactone, or ε-caprolactone, in accordance with the necessity. Only a single polybasic acid may be used, or two or more polybasic acids may be used in combination.

On the other hand, the glycol may be, for example, at least one selected from aliphatic glycols each having 2 to 10 carbon atoms, alicyclic glycols each having 6 to 12 carbon atoms, and ether-bond-containing glycols.

Examples of the aliphatic glycol having 2 to 10 carbon atoms include ethylene glycol, 1,2-propylene glycol, 1,3-propanediol, 1,4-butanediol, 1,5-pentanediol, neopentyl glycol, 1,6-hexanediol, 3-methyl-1,5-pentanediol, 1,9-nonanediol, 2-ethyl-2-butylpropanediol, hydroxypivalic acid neopentyl glycol ester, and dimethylol heptane.

Examples of the alicyclic glycol having 6 to 12 carbon atoms include 1,4-cyclohexane dimethanol and tricyclodecane dimethylol.

Examples of the ether-bond-containing glycol include diethylene glycol, triethylene glycol, dipropylene glycol, and further, a glycol obtained by adding one to several moles of ethylene oxide or propylene oxide to the two hydroxyl groups bonded to the aromatic ring of a bisphenol, such as 2,2-bis(4-hydroxyethoxyphenyl)propane. Polyethylene glycol, polypropylene glycol, and polytetramethylene glycol can also be used, in accordance with the necessity.

Examples of the organic diisocyanate compound include hexamethylene diisocyanate, tetramethylene diisocyanate, 3,3-dimethoxy-4,4'-biphenylene diisocyanate, p-xylylene diisocyanate, m-xylylene diisocyanate, 1,3-diisocyanate-methylcyclohexane, 1,4-diisocyanate-methylcyclohexane, 4,4'-diisocyanate dicyclohexylmethane, isophorone diisocyanate, 2,4-tolylene diisocyanate, 2,6-tolylene diisocyanate, p-phenylene diisocyanate, diphenylmethane diisocyanate, m-phenylene diisocyanate, 2,4-naphthalene diisocyanate, 3,3'-dimethyl-4,4'-biphenylene diisocyanate, 4,4'-diisocyanate diphenyl ether, and 1,5-naphthalene diisocyanate. Among these, hexamethylene diisocyanate, tetramethylene diisocyanate, isophorone diisocyanate, and diphenylmethane diisocyanate are preferable.

Examples of the chain elongating agent include ethylene glycol, propylene glycol, neopentyl glycol, 2,2-diethyl-1,3-propanediol, polyethylene glycol, diethylene glycol, polypropylene glycol, polytetramethylene glycol, tricyclodecane dimethylol, bisphenol A ethylene oxide adduct, and 1,4-cyclohexane dimethanol. Among these, ethylene glycol, polyethylene glycol, neopentyl glycol, diethylene glycol, and bisphenol A ethylene oxide adduct are more preferable.

The polyester resin may be synthesized by a known method. For example, the polyester resin may be synthesized in a solvent at a reaction temperature of 20 to 150° C. optionally using a catalyst, such as an amine or an organotin compound. Examples of the solvent include: ketones such as methyl ethyl ketone, methyl isobutyl ketone, and cyclohexanone; aromatic hydrocarbons such as toluene and xylene; and esters such as ethyl acetate and butyl acetate.

These polyester resins may be used alone, or two or more of them may be mixed for use. Further, according to necessity, conventionally known resins may be mixed and used as resin materials for constituting the non-laminate layer to improve the adhesive property and blocking property.

The content of the polyester resins in the entire resin components in the non-laminate layer is not particularly limited, and it is preferably in a range of 20 to 100% by weight and more preferably in a range of 50 to 100% by weight.

If the content of the polyester resins in the non-laminate layer is lower than 20% by weight, it may possibly be difficult to carry out adhesion and lamination easily and firmly.

—Fine Particles—

Fine particles with a volume average particle diameter of 1.5 µm to 5 µm are contained in the non-laminate layer of the laminate film for electrophotography of the invention. The fine particles are preferably contained at least at the surface of the non-laminate layer.

Preferably, the fine particles contained in the non-laminate layer are exposed slightly outward from the plane of the non-laminate layer surface and are fixed in the non-laminate layer so as not to drop out from the surface of the non-laminate layer. Due to the fine particles existing at the surface of the non-laminate layer in such a state, the friction coefficient of the surface of the laminate film for electrophotography (the non-laminate layer surface) can be lowered and therefore, the transportation property of the laminate film for electrophotography in a recording apparatus for electrophotography can be improved.

Further, due to the existence of the fine particles forming the projected parts slightly outward from the plane of the non-laminate layer surface, air existing between the surface of the laminate film for electrophotography (the non-laminate layer surface) and the heat press plate surface can efficiently be released within a short time, and therefore formation of the dimple (dent) traces of air accumulation on the surface of the information recording medium can be prevented or suppressed when laminating the laminate film and a core substrate sheet for a card (hereinafter, referred to as a "core substrate" in some cases) at approximately atmospheric pressure.

From a viewpoint of accomplishing the above-mentioned purpose, the size of the fine particles is required to be in a range of 1.5 to 5 µm and is preferably 2 to 3 µm, on the basis of the volume average particle diameter. The volume average particle diameter of the fine particles is selected basically so as to exceed the thickness of the non-laminate layer containing the fine particles, and is preferably selected so as to fix the fine particles such that some portions of the fine particles are exposed at the non-laminate layer surface.

Further, the existence density of the fine particles to be used for the above-mentioned purposes in the plane direction of the substrate is required to be 7/R particles or more per 10,000 square µm in the plane direction of the substrate, wherein R represents the volume average particle diameter.

If the number of fine particles is less than 7/R particles, the effect of releasing the air between the layer and the heat press plate surface becomes insufficient, and dimple (dent) traces of air accumulation remain on the non-laminate layer surface of the laminate film for electrophotography.

From the above-mentioned viewpoint, the number of fine particles is preferably 1.5 particles or more. However, if the number is too large, although the effect of releasing the air is sufficient, the fine particles may be aggregated and drop out, and the non-laminate layer surface may become white. Therefore, the number is preferably 35/R particles or less.

In the case where the non-laminate layer surface becomes white, in an information recording medium (information recording medium of a first embodiment which will be described later) obtained by laminating the laminate film for electrophotography in which a toner image is recoded on the laminate layer surface (image-recorded medium) and a core substrate, when the toner image is observed from the non-laminate layer side, the image appears cloudy.

Here, the thickness of the non-laminate layer is required to be not more than the volume average particle diameter R of the fine particles in order to provide escape paths for air existing between the non-laminate layer and the heat press plate during lamination, and is required to be not less than 0.1 µm.

The thickness of the non-laminate layer being in the above-mentioned range provides an advantage in that even if the heat press plate to be used for the heat pressure bonding is not a specular plate but a mat plate, excessive decrease in gloss due to the transfer of the surface shape of the mat plate to the non-laminate layer surface can be prevented.

If the thickness of the non-laminate layer is less than 0.1 µm, the fine particles are aggregated and accordingly the effect of releasing the air at the time of lamination becomes uneven at the interface between the non-laminate layer and the heat press plate to result in local formation of air accumulation traces like dimple patterns. Further, it becomes difficult to stably retain the fine particles in the non-laminate layer, so that dropping out of the fine particles sometimes takes place. In addition, since the non-laminate layer surface becomes white, in an information recording medium obtained by laminating the laminate film for electrophotography in which a toner image is recoded on the laminate layer surface (image-recorded medium) onto a core substrate, when the toner image is observed from the non-laminate layer side, the image appears cloudy.

On the other hand, if the thickness of the non-laminate layer is not less than the volume average particle diameter R of the fine particles, more fine particles tend to be completely embedded in the non-laminate layer, and therefore the air escaping paths cannot be surely retained at the time of lamination to result in formation of the air accumulation traces like the dimple patterns.

As shown in the inequality (2), the value (R−t) calculated by subtracting the thickness of the non-laminate layer from the volume average particle diameter of the fine particles is required to exceed zero, and in terms of more reliable assurance of the air escaping paths at the interface between the non-laminate layer and the heat press plate at the time of lamination, R−t is preferably more than 0.4 µm, more preferably 1 µm or more, and most preferably as close to 4.9 µm as possible (that is, the value calculated by subtracting the lower limit of t, 0.1 µm, from the upper limit of R, 5 µm).

However, if the R−t value is too high, the fine particles sometimes tend to easily drop out of the non-laminate layer, and from this viewpoint, it is preferably 3 µm or less.

The volume average particle diameter and the particle diameter distribution index of the fine particles to be used in the invention can be measured by using a Coulter Counter TA-II (manufactured by Beckman Coulter, Inc.) and ISO-TEN-II as an electrolytic solution (manufactured by Beckman Coulter, Inc.).

The measurement is carried out by adding 0.5 to 50 mg of a measurement sample to 2 ml of an aqueous solution containing 5% of a surfactant as a dispersant, preferably sodium alkylbenzenesulfonate, and adding the resulting solution to 100 to 150 ml of the above-mentioned electrolytic solution. Then, the obtained measurement sample is dispersed for about 1 minute by a supersonic dispersion apparatus, and the particle size distribution of the fine particles with a particle diameter in a range of 0.5 to 10 μm is measured by using an aperture with an aperture diameter of 60 μm by the above-mentioned Coulter Counter TA-II.

A cumulative distribution in the divided particle size ranges (channels) is drawn from the small diameter side in relation to the volume as the measured particle size distribution, and the particle diameter (D50v) at 50% cumulative volume is calculated as the average particle diameter.

The materials to be used for the fine particles of the invention are not particularly limited, and in the case where the fine particles are organic resin particles, practical examples are homopolymers or copolymers obtained by polymerization of one or more monomers selected from styrenes such as styrene, vinylstyrene, and chlorostyrene; monoolefins such as ethylene, propylene, butylene, and isobutylene; vinyl esters such as vinyl acetate, vinyl propionate, vinyl benzoate, and vinyl butyrate; esters of α-unsaturated fatty acid monocarboxylic acids such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate; vinyl ethers such as vinyl methyl ether, vinyl ethyl ether, and vinyl butyl ether; vinyl ketones such as vinyl methyl ketone, vinyl hexyl ketone, and vinyl isopropenyl ketone; and diene monomers such as isoprene and 2-chlorobutadiene.

Among these, styrenes and esters of α-unsaturated fatty acid monocarboxylic acids are preferable. In the case of forming the laminate layer (application) using a thermo-fusible resin as the fine particles, a coating solution for laminate layer formation containing a solvent which does not dissolve the resin components constituting the fine particles may be used. The fine particles, are more preferably selected from those produced from thermosetting resins, light curable resins, and electron beam curable resins provided with crosslinking structures by adding a crosslinking agent to these thermo-fusible resins.

When the particles are inorganic particles, specific examples of the substance constituting the particles include mica, talc, silica, calcium carbonate, zinc white, hallosite clay, kaolin, basic magnesium carbonate, quartz powder, titanium dioxide, barium sulfate, calcium sulfate, and alumina. As the shape of the particles, spherical shape is preferable.

As described above, to improve the transportation property of the laminate film for electrophotography, it is required to lower the friction of the surface of the laminate film for electrophotography by the fine particles, and in practical use, the static friction coefficient of the surface of the non-laminate layer side of the laminate film for electrophotography is preferably in a range of 0.2 to 1 and more preferably in a range of 0.3 to 0.65.

The weight ratio (fine particles:resin component) of the fine particles and the resin component in the non-laminate layer is preferably in a range of 0.01 to 0.3 parts, and more preferably in a range of 0.05 to 0.1 parts, of the fine particles to 1 part of the resin component.

If the mixing ratio of the fine particles is within the above-mentioned range to 1 part of the resin component, in a case of an information recording medium having a transparent non-laminate layer (the information recording medium with the layered structure of the first embodiment), the quality of the image observed from the non-laminate layer side can be kept stable and excellent.

On the other hand, if the mixing ratio of the fine particles to 1 part of the resin component is less than the above-described range, tackiness occurs, and in the case where laminate films for electrophotography are stored while being stacked, the films may possibly be stuck to one another. If it is higher than the above-described range, the membrane strength of the non-laminate layer of the laminate film for electrophotography after lamination cannot be assured sufficiently in some cases.

—Function Control Means—

Function control means may be supplied to the non-laminate layer. Accordingly, various kinds of functions can be supplied to the information recording medium produced from the laminate film for electrophotography of the invention. The function control means may have at least one function selected from a function for controlling a light fastness, a function for controlling an antibacterial property, a function for controlling a flame retardance, a function for controlling a releasing property, and a function for controlling an electrification property. More specifically, a conventionally known UV absorbing agent, anti-bacterial agent, flame retardant, releasing agent and charge control agent may be added to the non-laminate layer to obtain the above-mentioned functions.

<Laminate Layer>

The laminate layer of the laminate film for electrophotography of the invention can also function as an image reception layer, and before the information recording medium is produced by laminating the film together with the core substrate, a toner image is formed on the laminate layer surface by an electrophotographic method.

It is sufficient that the laminate layer is one containing resin and fine particles similarly to the non-laminate layer, and according to necessity, various kinds of additives such as a charge control agent or the like may be added. The resin constituting the laminate layer is not particularly limited, and polyester resin is preferably used.

Hereinafter, the resin (polyester resin) and the fine particles constituting the laminate layer will be described.

—Polyester Resin—

In the invention, as the resin constituting the laminate layer, polyester resin is particularly preferably used, and combinations of the polyester resin and other resins may also be used.

Similarly to the polyester resin to be used for the non-laminate layer, polyester resins to be used for the laminate layer of the laminate film for electrophotography of the invention are preferably saturated polyester resins obtained generally by condensation reaction of a polybasic acid having two or more carboxyl groups and a glycol.

—Fine Particles—

The laminate layer of the laminate film for electrophotography of the invention contains fine particles with a volume average particle diameter R' of 5 μm to 20 μm, and the volume average particle diameter R' is more preferably 10 μm to 15 μm. The fine particles are preferably contained at least in the vicinity of the surface of the laminate layer.

The thickness of the laminate layer preferably does not exceed the volume average particle diameter R' of the fine particles and more preferably is within a range of 1 μm to 10 μm for reliably retaining the adhesive property for holding the fine particles, the transportation property, and tackiness prevention.

(Information Recording Medium and Production Method Thereof)

Next, the information recording medium using the laminate film for electrophotography of the invention and the production method thereof will be described.

The information recording medium of the invention is not particularly limited as long as it is produced at least through a lamination process of laminating the surface at the laminate layer side of an image-recorded medium obtained by forming a toner image by an electrophotographic method on the surface of the laminate layer of the laminate film for electrophotography of the invention and at least one surface of a core substrate sheet for a card by heat pressure bonding, and specifically those having the following structure are preferable.

That is, the information recording medium of the invention preferably comprises a core substrate sheet for a card and an image-recorded medium bonded to at least one surface of the core substrate sheet for a card (the first embodiment) or comprises a core substrate sheet for a card and a laminate layer which is bonded to at least one surface of the core substrate sheet for a card and in which a toner image is formed on the surface at the core substrate side thereof (the second embodiment).

The information recording medium of the first embodiment can be produced through the above-mentioned lamination process whereas the information recording medium of the second embodiment can be obtained by using a substrate having a releasing property on the side where the laminate layer is to be formed as the substrate for the laminate film for electrophotography through the lamination process and the separation process for separating a layered product, which is obtained by the lamination process and comprises the core substrate sheet for a card and the image-recorded medium bonded to at least one surface of the core substrate sheet for a card, at the interface between the substrate and the laminate layer.

Hereinafter, the information recording media of the first and the second embodiments will be described in more detail along with the respective processes for their production.

—Image Formation—

First, before the lamination process, a toner image is formed on the surface of the laminate layer by an electrophotographic method.

The toner image formation on the laminate film for electrophotography by an electrophotographic manner is carried out as follows. First, electric charge is supplied evenly to the surface of a photoreceptor (an image carrier) to charge the surface, and then light exposure is performed on the surface according to obtained image information to form an electrostatic latent image corresponding to the exposure. Next, a toner, which is an image formation material, is supplied from a developer to the electrostatic latent image on the surface of the photoreceptor to visualize and develop the electrostatic latent image by the toner (to form a toner image). Further, the formed toner image is transferred to the laminate layer surface of the laminate film for electrophotography, and finally the toner image is fixed on the laminate layer surface by heat or pressure to form a toner image fixed on the surface of the laminate film for electrophotography.

Incidentally, the fixation treatment may be omitted, that is, merely an un-fixed toner image may be transferred to the surface of an un-printed laminate film. In this case, the temperature of the heating treatment at the time of lamination may be set so as to also allow fixation of the toner.

A material with good adhesion property to the toner is used for the surface of the laminate layer to be formed on the surface of the laminate film for electrophotography, so that the toner can be fixed sufficiently on the surface of the laminate layer at a temperature not higher than the temperature at which the toner is melted and becomes viscous.

Therefore, in the present invention, fixing of the toner image formed on the surface of the laminate film for electrophotography is carried out preferably in such a manner that the temperature of the surface of the laminate film (the surface on which the image is formed) is not higher than the melting temperature of the toner. In consideration of the melting temperature of ordinary toner, the surface temperature of the laminate film for electrophotography during the fixing is preferably 130° C. or lower, and more preferably 110° C. or lower.

Since the laminate film for electrophotography of the invention has the image formation surface (the surface at the side on which the laminate layer is formed) as the laminate surface, it is preferable to form the toner image, which is to be formed on the laminate layer surface of the laminate film for electrophotography which is in an un-printed state, as a reversed image (a mirror image). Accordingly, at the time of forming an electrostatic latent image on the photoreceptor surface, it is preferable to provide mirror image information as the image information used to perform exposure of the above-mentioned photoreceptor surface.

—Lamination Process—

It is preferable to carry out the process (the lamination process) for laminating the surface at the laminate layer side of the image-recorded medium and the core substrate by heat pressure bonding by various kinds of conventionally known lamination techniques and lamination apparatus employing a heat press method (hereinafter, referred to as a "plate-pressing method" in some cases) of setting a layered product of the core substrate and the image-recorded medium between a pair of pressing plate (heat press plates) at approximately atmospheric pressure and then pressing the layered product via the pair of the pressing plate while heating the layered product.

However, with respect to the production of the information recording medium of the invention, a heat press method (hereinafter, referred to as a "roll-pressing method" in some cases) of passing a layered product of a laminate film and a core substrate between a pair of rolls while heating the layered product can also be employed. In this roll press method, since the lamination is carried out while air is pushed out in one direction, as compared with the plate-pressing method, the air at the interface between the roll surface and the non-laminate layer easily escapes, and thus air accumulation traces like dimple patterns on the non-laminate layer after lamination are hardly formed. However, in a case where the roll diameter is large and the lamination is carried out by rotating the rolls at a high speed, air accumulation traces tend to be formed easily in conventional laminate films for electrophotography, and therefore, it is very effective to use the laminate film for electrophotography of the invention in such a case.

Further, in the case of the plate-pressing method, it is necessary to carry out the method at decreased pressure so as to prevent entertainment of air bubbles at the interface between the heat press plates and the surface of the image-recorded medium at the non-laminate layer side. However since the laminate film for electrophotography of the invention is used at the time of producing the information recording medium of the invention, even if lamination is carried out by employing the plate-pressing method at approximately atmospheric pressure, the air between the surface at the non-laminate layer side and the heat press plates can efficiently be released to produce an information recording medium that is free from air accumulation traces on the surface. In terms of not needing to perform pressure adjustment at the time of lamination, it is most preferable to carry out the lamination process at atmospheric pressure.

However, the lamination process, of course, can be carried out in environments of reduced pressure lower than atmospheric pressure or by a lamination method other than the above-mentioned plate-pressing method and roll-pressing method.

At the time of the lamination treatment using the plate-pressing method, in the case where a conventional laminate film for electrophotography is used, it takes several tens of minutes for heat pressure bonding in order to sufficiently release the air between substrates to the outside. However the air between substrates can quickly be released to the outside by the invention. Therefore, the time taken to carry out the heat pressure bonding is sufficient as long as sufficient time is secured to complete the transmission of the heat to the entire body of the layered product of the laminate film for electrophotography bearing the toner image and the core substrate. For this reason, even if the lamination is carried out at atmospheric pressure, it takes only 5 minutes or less to carry out the heat pressure bonding if the laminate film for electrophotography of the invention is used, and it is also possible to shorten the time to about 30 seconds and further to 20 seconds. Consequently, use of the laminate film for electrophotography of the invention can remarkably improve productivity of the information recording medium.

—Separation Process—

In the case of producing the information recording medium of the second embodiment, the separation process is carried out after the lamination process. It is required for the laminate film for electrophotography to have a releasing property on the substrate surface on which the laminate layer is to be formed. The separation is carried out by physical separation at the interface between the laminate layer and the substrate of the layered product obtained through the lamination process.

Since air accumulation traces like the dimple patterns as described above are directly formed at the surface of the non-laminate layer, even if the information recording medium of the second embodiment having no non-laminate layer is produced from a conventional laminate film for electrophotography, it is presumed that no air accumulation trace would be formed because the substrate and the non-laminate layer are separated off. However, since the thickness of the non-laminate layer and substrate constituting the laminate film for electrophotography is generally thin, the air accumulation traces (unevenness) formed on the surface of the non-laminate layer are actually reflected as the unevenness of the surface of the laminate layer at the substrate side.

However, in the information recording medium of the second embodiment produced from the laminate film for electrophotography of the invention, since the air accumulation traces are scarcely formed on the surface of the non-laminate layer, even if the thickness of the non-laminate layer and substrate is very thin, occurrence of unevenness attributed to air accumulation traces in the non-laminate layer can be suppressed on the surface at the laminate layer side of the information recording medium.

Unlike the information recording medium of the first embodiment, in the information recording medium of the second embodiment produced in the above-mentioned separation process, the gloss of the surface of the information recording medium where the laminate layer is formed is determined depending on the smoothness of the substrate surface, and therefore, if a substrate excellent in the smoothness of the surface is used, a remarkably excellent gloss surface can easily be obtained.

—Core Substrate Sheet for a Card—

A core substrate sheet for a card to be used for an information recording medium of the invention is preferably opaque so that a toner image formed on a laminate film for electrophotography (laminate layer surface) in the information recording medium can be easily seen. As the core substrate sheet for a card, white plastic films are typically used, but transparent plastic films may be used in some applications. In the case where the core substrate is not transparent, in the information recording medium of the first embodiment, it is necessary for the laminate layer, the substrate, and the non-laminate layer constituting the laminate film for electrophotography to be transparent, and in the information recording medium of the second embodiment, it is necessary for at least the laminate layer constituting the laminate film for electrophotography to be transparent.

In the invention, as the resin for the core substrate, PETG, polyvinyl chloride (PVC), or the like are used. Also, those obtained by forming a PETG layer on PET may be used as the resin for the core substrate. Further, to improve the adhesion property to the laminate film for electrophotography having the toner image, an adhesive layer is preferably formed on the surface of the core substrate. As the material constituting the adhesive layer, conventionally known materials having a pressure-sensitive bonding property can be used, and a polyester resin is preferably used.

As a method for whitening the core substrate, a method may be employed in which a white pigment is mixed in the PETG or PVC film. The white pigment may be, for example: particles of a metal oxide such as silicon oxide, titanium oxide, or calcium oxide; an organic white pigment; or polymer particles. It is also possible to subject the surface of the plastic sheet to sandblasting, embossing, or the like, thereby providing the surface of the PETG or PVC film with irregularities. The irregularities cause scattering of light, thereby whitening PETG or PVC film.

As the core substrate sheet for a card to be used for the invention, plastic PETG and a PVC film with a thickness in a range of 50 to 5,000 µm are preferably used and PETG and a PVC film with a thickness in a range of 100 to 1,000 µm are more preferably used.

In the invention, it is preferable to arrange an information chip inside or outside of the core substrate, on which chip information can be read out and written in by using at least one means selected from electric means, magnetic means, and optical means.

The information chip is not particularly limited, provided that the information chip stores information having some identification function and that the information is readable by using at least one selected from an electric system, a magnetic system, and an optical system. The information chip may be of read-only type. As an alternative, the information chip may be an information chip on which information can be read and written (including "rewriting"), in accordance with the necessity. Specific examples of such an information chip include an IC chip (a semiconductor circuit) when the information recording media is used as an IC card.

When the above-mentioned information chip is used as an information source of the information recording medium, it is not always necessary for the entire toner image or a part of the toner image to have any information having identification function.

The information held by the information chip is not particularly limited, provided that the information is identifiable. The information may contain variable information. The term "variable information" means such information that the specific information recorded on each information recording medium is different when a plurality of information recording media are manufactured on the same specifications or standard.

For example, when the toner image contains variable information, the part of the toner image corresponding to the variable information may vary from one information recording medium to another.

Further, the variable information may contain personal information. In this case, the information recording medium of the present invention is applicable to cash cards, employee identification cards, student identification cards, individual membership cards, resident identification cards, various types of driver's licenses, various types of qualification certificates, and the like. When the information recording medium is used for such applications, examples of the personal information include a facial photograph, image information for identity verification, the name, the address, the date of birth, and a combination thereof.

The method for incorporating a semiconductor circuit in the core substrate for a card may be a method of interposing a sheet called an inlet having a semiconductor circuit fixed thereon between sheet materials for constituting the core substrate, and then conducting hot press to integrate them by thermal fusion bonding. It is also possible to use a method of directly disposing a semiconductor circuit without using the inlet sheet, and then integrating the core substrate and the semiconductor circuit by thermal fusion bonding in the same manner as described above.

Instead of using the above-mentioned thermal fusion bonding, it is also possible to bond the sheets constituting the core substrate to each other by using an adhesive such as hot-melt in the process for incorporating a semiconductor circuit. However, the method for manufacturing the core substrate is not limited to the above methods, and may be, for example, any method for incorporating a semiconductor circuit into an IC card.

Further, it is also possible to dispose the semiconductor circuit such that the semiconductor circuit is exposed on the surface of the core substrate, rather than inside the core substrate, as long as the information recording medium can be practically usable.

When the information recording medium of the present invention is used as an IC card or the like, an antenna, an external terminal, or the like is embedded in accordance with the necessity. In addition, a hologram, or the like may be printed on the information recording medium, or the necessary textual information may be embossed on the information recording medium.

—Practical Example of Information Recording Medium—

Next, the information recording medium described above will be described in more detail.

The information recording medium of the invention may be in form of the above-mentioned first and second embodiments and an information chip may be disposed in at least one position, such as in the inside of the core substrate and on the surface of the core substrate (the surface to be bonded to the laminate layer and/or the surface of the reverse side of the surface to be bonded to the laminate layer).

It is preferable that at least urethane-modified polyester resin is contained at least on the core substrate surface to be laminated. In this case, when the laminate film and the core substrate are laminated, both are more firmly stuck to each other.

The toner image formed on the surface of the laminate layer is not particularly limited, and may be such a toner image that a part or the whole of the toner image serves as information with some identification function, such as a toner image containing image information or textual information. In addition, the information contained in the toner image does not always have to be identifiable visually, and may be identified mechanically.

In the case of the information recording medium provided with the information chip, the information chip contains information having some identifying function. Further details about the information chip will be described later.

When the above-mentioned information chip is used as an information source of the information recording medium, it is not always necessary for the entire toner image or a part of the toner image to have any information having identification function.

On the other hand, the information held by the toner image or the information chip is not particularly limited, provided that the information is identifiable. The information may contain variable information. The term "variable information" refers to such information that the specific information recorded on each information recording medium is different when a plurality of information recording media are manufactured on the same specifications or standard. For example, when the toner image contains variable information, the part of the toner image corresponding to the variable information may vary from one information recording medium to another.

When laminating, the overlapping of the laminate film for electrophotography and the core substrate may be carried out by aligning the laminate film and the core substrate by holding them by hand, or may be carried out by sequentially delivering the laminate film and the core substrate to a collation tray or the like and automatically aligning them after an image has been formed on the laminate film for electrophotography.

In the case the information recording medium produced through the lamination process and further the separation process contains a plurality of toner images, the images are respectively cut apart, and a plurality of information recording media of a prescribed size can be obtained.

Next, the laminate film for electrophotography and the information recording medium of the invention will be described in more detail with reference to drawings.

FIG. 1 is a schematic cross-sectional view showing one example of a laminate film for electrophotography of the invention. In FIG. 1, the reference numerals are as follows: 10 represents a substrate (for a laminate film for electrophotography); 11 represents a PET resin layer constituting the substrate 10; 12 represents a PETG resin layer constituting the substrate 10; 30 represents a non-laminate layer; 40 represents fine particles (contained in the non-laminate layer); 50 represents a laminate layer; 60 represents fine particles (contained in the laminate layer); and 101 represents a laminate film for electrophotography.

The laminate film for electrophotography 101 shown in FIG. 1 comprises the substrate 10 composed of the PET resin layer 11 and the PETG resin layer 12, the non-laminate layer 30 formed on the surface at the PET resin layer 11 side of the substrate 10, and the laminate layer 50 formed on the surface at the PETG resin layer 12 side of the substrate 10. The non-laminate layer 30 and the laminate layer 50 contain fine particles 40 and fine particles 60, respectively.

The laminate layer 50 also has a function of an image receiving layer, and a toner image is formed on the surface of the laminate layer 50. As the resin constituting the layer, a polyester resin can be used. Further, according to necessity, function control means may be formed in the non-laminate layer 30.

Next, an information recording medium of the first embodiment produced from the laminate film for electrophotography 101 shown in FIG. 1 will be described.

Figure 2:
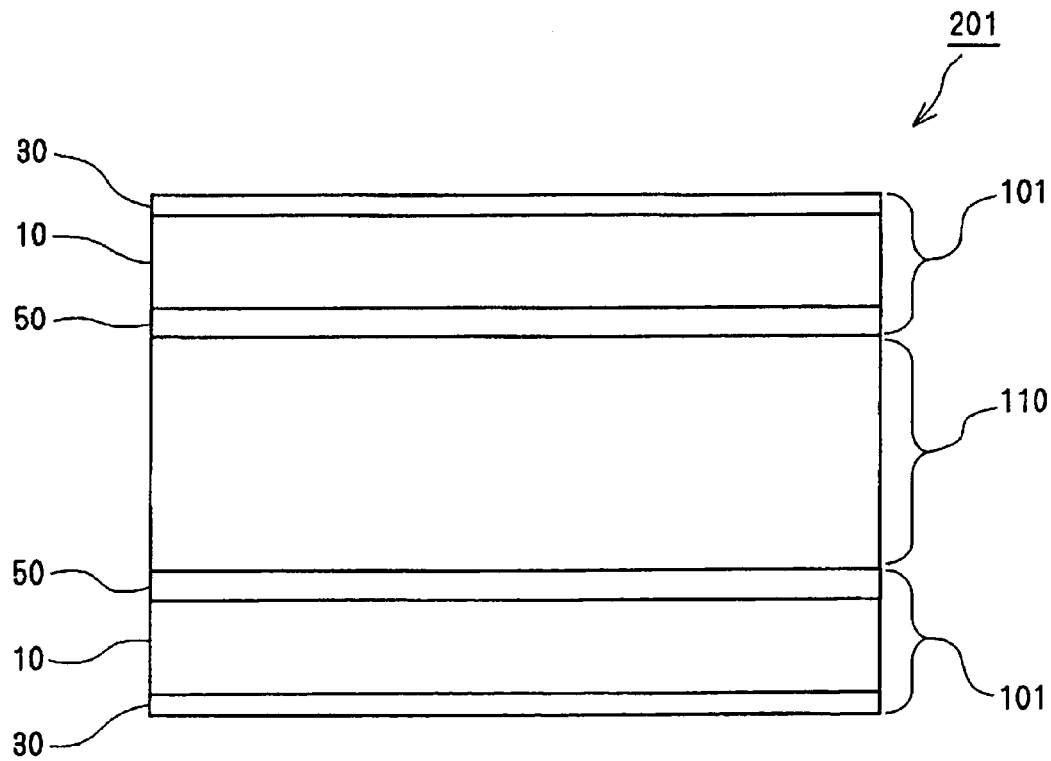
FIG. 2 is a schematic cross-sectional view showing one example of an information recording medium of the invention.

FIG. 2 is a schematic cross-sectional view showing one example of the information recording medium of the invention and shows the information recording medium of the first embodiment. In FIG. 2, reference numeral 110 represents a core substrate, reference numeral 201 represents an information recording medium, and other components denoted by the respective reference numerals are same as those shown in FIG. 1. In FIG. 2, the toner image and fine particles 40 and 60 are omitted.

The information recording medium 201 shown in FIG. 2 is formed by laminating on both surfaces of an opaque core substrate 110 laminate films for electrophotography 101 in which toner images (not illustrated) are formed on the surfaces of the laminate layers 50. In this case, the two laminate films for electrophotography 101 constituting the information recording medium 201 are transparent. In the case where the laminate film for electrophotography 101 is laminated only on one surface of the core substrate 110, either one of the core substrate 110 or the laminate film for electrophotography 101 may be transparent.

Figure 3:
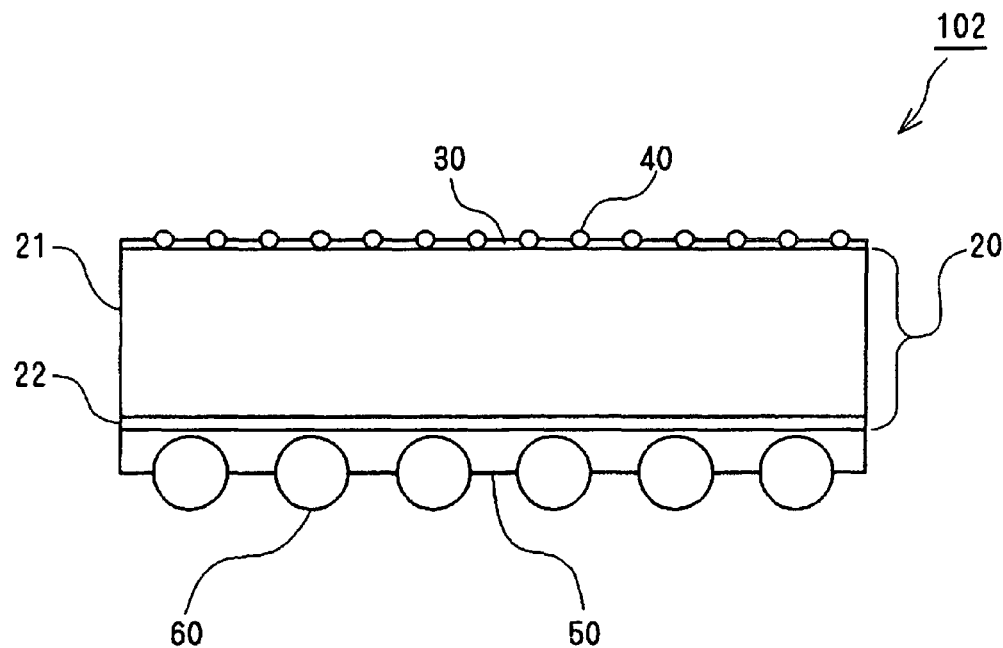
FIG. 3 is a schematic cross-sectional view showing another example of a laminate film for electrophotography of the invention.

FIG. 3 is a schematic cross-sectional view showing another example of a laminate film for electrophotography of the invention. In FIG. 3, the reference numerals are as follows: 20 represents a substrate (for a laminate film for electrophotography); 21 represents a PET resin layer constituting the substrate 20; 22 represents a resin layer (a releasing layer) having a releasing property; 102 represents a laminate film for electrophotography; and other components denoted by the respective reference numerals are same as those shown in FIG. 1.

The laminate film for electrophotography 102 shown in FIG. 3 comprises the substrate 20 composed of the PET resin layer 21 and a releasing layer 22 formed in a thin film-like form on the surface of the PET resin layer 21; a non-laminate layer 30 formed on the surface of the substrate 20 at the PET resin layer 21 side thereof; and a laminate layer 50 formed on the surface of the substrate 20 at the releasing layer 22 side thereof. The non-laminate layer 30 and the laminate layer 50 contain fine particles 40 and fine particles 60, respectively.

The laminate layer 50 also has a function of an image receiving layer, and a toner image is formed on the surface of the laminate layer 50. As the resin constituting the layer, a polyester resin can be used. Further, according to necessity, function control means may be formed in the non-laminate layer 30.

Next, an information recording medium of the second embodiment produced from the laminate film for electrophotography 102 shown in FIG. 4 will be described.

Figure 4:
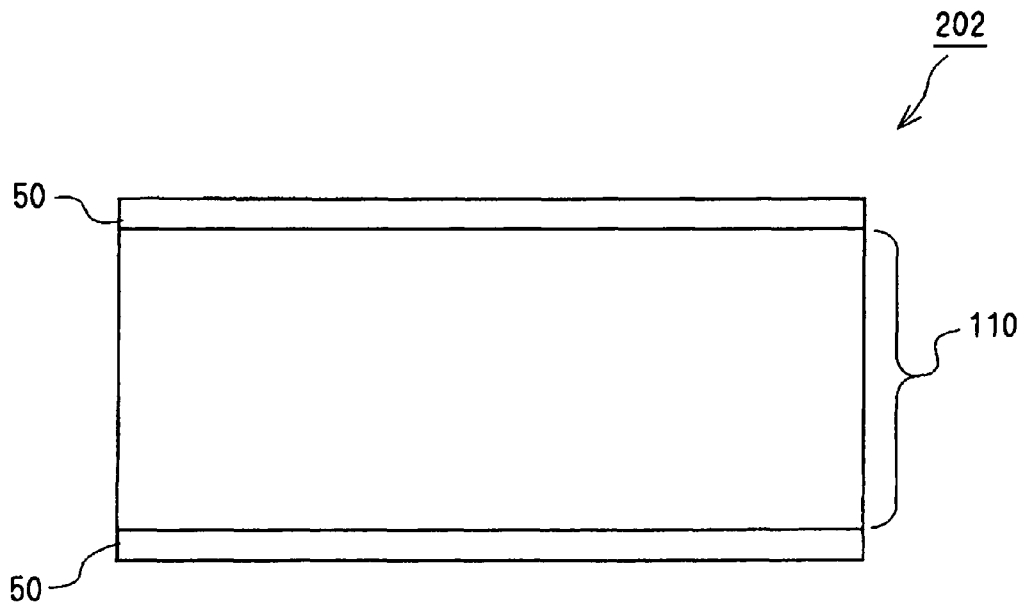
FIG. 4 is a schematic cross-sectional view showing another example of an information recording medium of the invention.

FIG. 4 is a schematic cross-sectional view showing another example of the information recording medium of the invention and shows the information recording medium of the second embodiment. In FIG. 4, 202 represents an information recording medium and other components denoted by the respective reference numerals are same as those shown in FIG. 2. In FIG. 4, the toner image and fine particles 40 and 60 are omitted.

The information recording medium 202 shown in FIG. 4 is formed by laminating laminate films for electrophotography 102 in which toner images (not illustrated) are formed on the surfaces of the laminate layers 50 on both surfaces of the opaque core substrate 110, and separating the interface between the laminate layer 50 and the substrate 20 of these two laminate films for electrophotography 102. In this case, the two laminate layers 50 constituting the information recording medium 202 are transparent. In the case where the laminate film for electrophotography 102 is laminated only on one surface of the core substrate 110 and then the interface between the laminate layer 50 and the substrate 20 is separated to produce the information recording medium, either one of the core substrate 110 or the laminate film 50 may be transparent.

Hereinafter, various aspects of the invention are described.

A first aspect of the invention provides a laminate film for electrophotography comprising a substrate, a laminate layer formed on one surface of the substrate, and a non-laminate layer formed on the other surface of the substrate, wherein the non-laminate layer contains at least a resin and fine particles and satisfies the following inequalities (1) to (3):

$$1.5 \leq R \leq 5; \qquad \text{inequality (1)}$$

$$0.1 \leq t < R; \text{ and} \qquad \text{inequality (2)}$$

$$7/R \leq n, \qquad \text{inequality (3)}$$

wherein R represents a volume average particle diameter (μm) of the fine particles; t represents a thickness (μm) of the non-laminate layer; and n represents the number of the fine particles contained in the non-laminate layer per 10,000 square μm in the substrate plane direction (particles/(100 μm)$^2$).

A second aspect of the invention provides the laminate film for electrophotography of the first aspect of the invention, wherein the non-laminate layer further satisfies the following inequality (4):

$$R-t>0.4 \qquad \text{inequality (4)}$$

wherein R represents the volume average particle diameter (μm) of the fine particles; and t represents the thickness (μm) of the non-laminate layer.

A third aspect of the invention provides the laminate film for electrophotography of the first aspect of the invention, wherein the surface of the substrate, on which the laminate layer is formed, has a releasing property.

A fourth aspect of the invention provides the laminate film for electrophotography of the third aspect of the invention, wherein the surface of the substrate, on which the laminate layer is formed, contains a material having a releasing property, the material being one material selected from a condensate resin containing a silane type composition or a mixture of the condensate resin containing a silane type composition and a colloidal silica dispersion liquid.

A fifth aspect of the invention provides the laminate film for electrophotography of the first aspect of the invention, wherein the substrate contains a polyethylene terephthalate resin as a main component.

A sixth aspect of the invention provides the laminate film for electrophotography of the fifth aspect of the invention, wherein the substrate further contains a polyester resin obtained by copolymerization of at least terephthalic acid and 1,4-cyclohexanedimethanol.

A seventh aspect of the invention provides the laminate film for electrophotography of the first aspect of the invention, wherein function control means is provided in the non-laminate layer, the function control means having at least one function selected from a function for controlling a light fastness, a function for controlling an antibacterial property, a function for controlling a flame retardance, a function for controlling a releasing property, and a function for controlling an electrification property.

An eighth aspect of the invention provides an information recording medium comprising a core substrate sheet for a card and a laminate layer bonded to at least one surface of the core substrate sheet for a card, a toner image being formed on a surface of the laminate layer at the core substrate sheet for a card side thereof, wherein the information recording medium is produced at least through a lamination process of laminating the surface of the laminate layer of an image-recorded medium and the at least one surface of the core substrate sheet for a card by heat pressure bonding, wherein the image-recorded medium comprises a substrate, the laminate layer formed on one surface of the substrate, and a non-laminate layer formed on the other surface of the substrate, the toner image being formed on the surface of the laminate layer by use of an electrophotographic method, and wherein the non-laminate layer contains at least a resin and fine particles and satisfies the following inequalities (5) to (7):

$$1.5 \leq R \leq 5; \quad \text{inequality (5)}$$

$$0.1 \leq t < R; \text{ and} \quad \text{inequality (6)}$$

$$7/R \leq n, \quad \text{inequality (7)}$$

wherein R represents a volume average particle diameter (μm) of the fine particles; t represents a thickness (μm) of the non-laminate layer; and n represents the number of the fine particles contained in the non-laminate layer per 10,000 square μm in the substrate plane direction (particles/(100 μm)$^2$).

A ninth aspect of the invention provides the information recording medium of the eighth aspect of the invention comprising the core substrate sheet for a card and the image-recorded medium bonded to the at least one surface of the core substrate sheet for a card.

A tenth aspect of the invention provides the information recording medium of the eighth aspect of the invention, wherein the surface of the substrate, on which the laminate layer is formed, has a releasing property, wherein the information recording medium is produced through the lamination process and a separation process, and wherein the separation process is a process of separating a layered product, which comprises the core substrate sheet for a card and the image-recorded medium bonded to the at least one surface of the core substrate sheet for a card, at an interface between the substrate and the laminate layer, the layered product being obtained by the lamination process.

An eleventh aspect of the invention provides the information recording medium of the eighth aspect of the invention, wherein the laminate layer is transparent, and the toner image is formed on the surface of the laminate layer in the form of a mirror image.

A twelfth aspect of the invention provides the information recording medium of the eighth aspect of the invention, wherein the core substrate sheet for a card contains an information chip on which information can be read out and/or written in by using at least one means selected from electric means, magnetic means, or optical means.

A thirteenth aspect of the invention provides a method for producing an information recording medium, comprising at least a lamination process of laminating a surface of a laminate layer of an image-recorded medium and at least one surface of a core substrate sheet for a card by heat pressure bonding, wherein the image-recorded medium is obtained by forming a toner image on the surface of the laminate layer of a laminate film for electrophotography by use of an electrophotographic method, the laminate film for electrophotography comprising a substrate, the laminate layer formed on one surface of the substrate, and a non-laminate layer formed on the other surface of the substrate, and wherein the non-laminate layer contains at least a resin and fine particles and satisfies the following inequalities (8) to (10):

$$1.5 \leq R \leq 5; \quad \text{inequality (8)}$$

$$0.1 \leq t < R; \text{ and} \quad \text{inequality (9)}$$

$$7/R \leq n, \quad \text{inequality (10)}$$

wherein R represents a volume average particle diameter (μm) of the fine particles; t represents a thickness (μm) of the non-laminate layer; and n represents the number of the fine particles contained in the non-laminate layer per 10,000 square μm in the substrate plane direction (particles/(100 μm)$^2$).

A fourteenth aspect of the invention provides the method of the thirteenth aspect of the invention, wherein the information recording medium comprises the core substrate sheet for a card and the image-recorded medium bonded to the at least one surface of the core substrate sheet for a card.

A fifteenth aspect of the invention provides the method of the thirteenth aspect of the invention, wherein the surface of the substrate, on which the laminate layer is formed, has a releasing property, wherein the information recording medium is produced through the lamination process and a separation process, wherein the separation process is a process of separating a layered product, which comprises the core substrate sheet for a card and the image-recorded medium bonded to the at least one surface of the core substrate sheet for a card, at an interface between the substrate and the laminate layer, the layered product being obtained by the lamination process, and wherein the information recording medium comprises the core substrate sheet for a card and the laminate layer bonded to the at least one surface of the core substrate sheet for a card, the toner image being formed on the surface of the laminate layer at the core substrate sheet for a card side thereof.

A sixteenth aspect of the invention provides the method of the thirteenth aspect of the invention, wherein the time taken for the heat pressure bonding is 5 minutes or less.

A seventeenth aspect of the invention provides the method of the thirteenth aspect of the invention, wherein an adhesive layer is formed on the surface of the core substrate sheet for a card, on which the surface of the laminate layer of the image-recorded medium is laminated.

An eighteenth aspect of the invention provides the method of the fourteenth aspect of the invention, wherein the heat pressure bonding is carried out at atmospheric pressure.

EXAMPLES

Hereinafter, the present invention will be more specifically described by using Examples. However, the present invention is by no means limited to the following Examples. In the following description, the term "part" used in the Examples and Comparative Examples means "part by weight".

Evaluation of Laminate Film for Electrophotography and Information Recording Medium of the First Embodiment Produced by Using the Same Example A1

A laminate film for electrophotography (a laminate film 1 for electrophotography) and an information recording medium using the laminate film are produced by the following procedures.

<Production of the Laminate Film 1 for Electrophotography>

(Preparation of Coating Solution A-1 for Non-Laminate Layer)

20 parts of polyester resin (Foret FF-4M, solid matter 30% by weight in a methyl ethyl ketone solution; manufactured by Soken Chemical & Engineering Co., Ltd.), 0.3 parts of crosslinked type acrylic fine particles (MX 150, volume average particle diameter R1: 1.5 µm, R1 satisfies the inequality (1); manufactured by Soken Chemical & Engineering Co., Ltd.), and 0.3 parts of a surfactant (Elegan 264 WAX, manufactured by Nippon Oil & Fats Co., Ltd.) are added to 180 parts of a liquid mixture of cyclohexanone and methyl ethyl ketone at a weight ratio of 10:90 and sufficiently stirred to obtain a coating solution A-1 for a non-laminate layer.

(Preparation of Coating Solution B-1 for Laminate Layer)

10 parts of polyester resin (Foret FF-4M, solid matter 30% by weight in a methyl ethyl ketone solution; manufactured by Soken Chemical & Engineering Co., Ltd.), 0.4 parts of crosslinked type methacrylic acid ester copolymer fine particles as a mat agent (MX 1000, volume average particle diameter R1: 10 µm; manufactured by Soken Chemical & Engineering Co., Ltd.), and 0.3 parts of a surfactant (Elegan 264 WAX, manufactured by Nippon Oil & Fats Co., Ltd.) are added to a liquid mixture of 10 parts of toluene and 30 parts of methyl ethyl ketone and sufficiently stirred to obtain a coating solution B-1 for a laminate layer.

(Production of Laminate Film 1 for Electrophotography)

As a substrate, a film (Melinex 3368; total thickness of 100 µm; manufactured by Teijin DuPont Co., Ltd.) composed of a PET resin layer and a PETG resin layer (thickness about 16 µm) obtained by copolymerization of ethylene glycol, terephthalic acid, and 1,4-cyclohexanedimethanol is used, the PETG resin layer being formed on one surface of the PET resin layer. The above-mentioned coating solution A-1 for a non-laminate layer is applied to the surface of the substrate at the PET resin layer side thereof by a wire bar and dried at 80° C. for 60 seconds to form a non-laminate layer with a thickness t1 of 0.1 µm (t1 satisfies the inequality (2)). Further, the above-mentioned coating solution B-1 for an image receiving layer is applied to the surface of the substrate at the PETG resin layer side thereof by a wire bar and dried at 80° C. for 60 seconds to form a 2 µm-thick laminate layer, and then the resulting substrate is cut into A4 size (210 mm×297 mm) to obtain a laminate film 1 for electrophotography.

<Evaluation of the Laminate Film for Electrophotography (Non-Laminate Layer)>

Ten sheets of the laminate film 1 for electrophotography obtained in the above-described manner are produced, the center portion of the surface of the non-laminate layer of the laminate film 1 for electrophotography is observed using an optical microscope (observation magnification: 1000 times) to investigate dropping out, embedding, and aggregating states of the fine particles of the non-laminate layer, and evaluation thereof is carried out according to the following standards. The results are shown in Table 1.

—Dropping Out State of Fine Particles—

A: the ratio of the traces of dropping out of the fine particles in the observed visible field [=the number of dropping out traces/(the number of the dropping out traces+the number of fine particles remaining without dropping out)] is 0% for ten sheets;

B: the ratio of the traces of dropping out of the fine particles in the observed visible field is more than 0% but not more than 50% on average for ten sheets; and C: the ratio of the traces of dropping out of the fine particles in the observed visible field is more than 50% on average for ten sheets.

—Embedding State of Fine Particles—

A: no fine particle in the observed visible field is embedded in any of the ten sheets; and B: fine particles in the observed visible field are embedded in one or more of the ten sheets.

—Aggregating State of Fine Particles—

A: no fine particle in the observed visible field is aggregated in any of the ten sheets; and B: the fine particles in the observed visible field are aggregated in one or more of the ten sheets.

Further, the number n1 of the fine particles (the average value for the ten sheets) existing in an area of 100 µm×100 µm of the surface of the non-laminate layer is 5 particles/(100 µm)$^2$, satisfying the inequality (3).

(Production of Image-Recorded Medium)

Next, an image-recorded medium 1-U of A4 size having formed thereon 9 images (card size) which are color mirror images including solid images, and an image-recorded medium 1-D similarly having formed thereon 9 images which are mirror images of only letter information are produced by using a modified (modified so as to control the surface temperature of the laminate film at fixation to be in a range of 95 to 100° C.) DocuColor 1255 CP color copying machine manufactured by Fuji Xerox Co., Ltd. to form the above-described images on the laminate layer surface of the above-mentioned laminate film 1.

<Production of Core Substrate Sheet 1 for Card>

(Preparation of Coating Solution C-1 for Adhesive Layer)

50 parts of cyclohexanone as a solvent is added to and sufficiently mixed with 100 parts of a solution containing polyester resin (Vylon UR 1350, a methyl ethyl ketone 50% by weight/toluene 50% by weight solution containing 33% by weight of polyester resin as the solid matter; manufactured by Toyobo Co., Ltd.) and, as fine particles, 50 parts of crosslinked methacrylic acid ester copolymer fine particles (MX-3000, volume average particle diameter: 30 µm; manufactured by Soken Chemical & Engineering Co., Ltd.) to prepare a coating solution C-1 for an adhesive layer.

(Production of Core Substrate Sheet for Card)

The above-mentioned coating solution C-1 for an adhesive layer is applied to one surface side of a white PETG resin sheet of B4 size (Diafix WHI, total thickness: 560 µm, manufactured by Mitsubishi Plastics INC.) by an applicator and dried at 50° C. for 30 minutes and the same treatment is carried out for the other surface to form 25 µm-thick adhesive layers on the front and back surfaces, and the resulting sheet is cut into A4 size (210 mm×297 mm) to produce a core substrate sheet 1 for a card. The surface of the core substrate sheet 1 for a card on which the adhesive layer is formed is observed using an optical microscope to find that the fine particles exist in the surface of the adhesive layer while being partially exposed.

<Production of Information Recording Medium>

The image-formed surface of the above-mentioned image recorded medium 1-U and the image-formed surface of the above-mentioned image recorded medium 1-D are respectively laid on one surface and the other surface of the core substrate sheet 1 for a card such that positions of the respective four corners are matched, and the three-substrate layered product is sandwiched between a pair of press plates made of a SUS steel and having specularly polished surfaces for pressing.

The obtained layered product wherein the above fitting and layering have been carried out (the press plate/the image recorded medium 1-U/the core substrate sheet 1 for a card/the image recorded medium 1-D/the press plate) is heat pressed with a temperature of the upper and lower press plates set to 110° C. at 10 kgf/cm$^2$ for 30 seconds at atmospheric pressure to carry out lamination and is cooled to room temperature, and then the press plates are removed to obtain an information recording medium 1. The above-mentioned process is repeated ten times to obtain a total of 10 sheets of the information recording medium 1.

<Evaluation of Air Accumulation Traces on the Surface of Information Recording Medium>

With respect to the ten sheets of the information recording medium 1, air accumulation traces (air accumulation traces like dimple patterns) on both surfaces of the information recording medium are evaluated according to the following standards.

A: the average number of air accumulation traces is zero by eye observation of the front and the back surfaces of each of the ten sheets;

B: the average number of air accumulation traces is more than 0 but is less than 3 by eye observation of the front and the back surfaces of each of the ten sheets; and C: the average number of air accumulation traces is 3 or more by eye observation of the front and the back surfaces of each of the ten sheets.

<Evaluation of Finished Glossiness of Information Recording Medium>

With respect to the ten sheets of the information recording medium 1, the glossiness is evaluated according to the following standards. The glossiness is measured by measuring 75° specular reflectivity by a glossmeter (MODEL GM-26D FOR 75°, manufactured by Murakami Color Research Laboratory Co., Ltd.).

A: the average value of 75° specular reflectivity is 95% or more for glossiness measurement at nine points (center points of respective cards of 9 face-imposition) on the front and back surfaces of the ten sheets;

B: the average value of 75° specular reflectivity is 40% or more but less than 95% for glossiness measurement at nine points (center points of respective cards of 9 face-imposition) on the front and back surfaces of the ten sheets; and C: the average value of 75° specular reflectivity is less than 40% for glossiness measurement at nine points (center points of respective cards of 9 face-imposition) on the front and back surfaces of the ten sheets.

The above-mentioned respective evaluation results are shown in Table 1.

Example A2

Preparation of Coating Solution A-2 for Non-Laminate Layer 20 parts of polyester resin (Foret FF-4M, solid matter 30% by weight in a methyl ethyl ketone solution; manufactured by Soken Chemical & Engineering Co., Ltd.), 0.24 parts of crosslinked type acrylic fine particles (MX 150, volume average particle diameter R2: 1.5 μm, R2 satisfies the inequality (1); manufactured by Soken Chemical & Engineering Co., Ltd.), and 0.3 parts of a surfactant (Elegan 264 WAX, manufactured by Nippon Oil & Fats Co., Ltd.) are added to 80 parts of a liquid mixture of cyclohexanone and methyl ethyl ketone at a weight ratio of 10:90 and sufficiently stirred to obtain a coating solution A-2 for a non-laminate layer.

An image-recorded medium 2 and an information recording medium 2 are produced in the same manner as in Example A1, except that a laminate film 2 for electrophotography obtained by using the coating solution A-2 for a non-laminate layer in place of the coating solution A-1 for a non-laminate layer to form a non-laminate layer with a thickness t2 of 1 μm (t2 satisfies the inequality (2)) is used.

The surface of the non-laminate layer of the laminate film 2 for electrophotography is observed using an optical microscope in the same manner as in Example A1 to find that the fine particles are not dropped out or embedded and no aggregation of the fine particles takes place.

Further, the number n2 (the average value of 10 sheets) of the fine particles existing in an area of 100 μm×100 μm on the non-laminate layer surface is 23 particles/(100 μm)$^2$, satisfying the inequality (3).

The evaluation results for the laminate film 2 for electrophotography and the information recording medium 2 evaluated by the same manner as in Example A1 are shown in Table 1.

Example A3

Preparation of Coating Solution A-3 for Non-Laminate Layer 20 parts of polyester resin (Foret FF-4M, solid matter 30% by weight in a methyl ethyl ketone solution; manufactured by Soken Chemical & Engineering Co., Ltd.), 1.5 parts of crosslinked type acrylic fine particles (MX 300, volume average particle diameter R3: 3 μm, R3 satisfies the inequality (1); manufactured by Soken Chemical & Engineering Co., Ltd.), and 0.3 parts of a surfactant (Elegan 264 WAX, manufactured by Nippon Oil & Fats Co., Ltd.) are added to 180 parts of a liquid mixture of cyclohexanone and methyl ethyl ketone at a weight ratio of 10:90 and sufficiently stirred to obtain a coating solution A-3 for a non-laminate layer.

An image-recorded medium 3 and an information recording medium 3 are produced in the same manner as in Example A1, except that a laminate film 3 for electrophotography obtained by using the coating solution A-3 for a non-laminate layer in place of the coating solution A-1 for a non-laminate layer to form a non-laminate layer with a thickness t3 of 0.15 μm (t3 satisfies the inequality (2)) is used.

The surface of the non-laminate layer of the laminate film 3 for electrophotography is observed using an optical microscope in the same manner as in Example A1 to find that the fine particles are not dropped out or embedded and no aggregation of the fine particles takes place.

Further, the number n3 (the average value of 10 sheets) of the fine particles existing in an area of 100 μm×100 μm on the non-laminate layer surface is 5 particles/(100 μm)², satisfying the inequality (3).

The evaluation results for the laminate film 3 for electrophotography and the information recording medium 3 evaluated by the same manner as in Example A1 are shown in Table 1.

Example A4

Preparation of Coating Solution A-4 for Non-Laminate Layer 20 parts of polyester resin (Foret FF-4M, solid matter 30% by weight in a methyl ethyl ketone solution; manufactured by Soken Chemical & Engineering Co., Ltd.), 0.35 parts of crosslinked type acrylic fine particles (MX 300, volume average particle diameter R4: 3 μm, R4 satisfies the inequality (1); manufactured by Soken Chemical & Engineering Co., Ltd.), and 0.3 parts of a surfactant (Elegan 264 WAX, manufactured by Nippon Oil & Fats Co., Ltd.) are added to 80 parts of a liquid mixture of cyclohexanone and methyl ethyl ketone at a weight ratio of 10:90 and sufficiently stirred to obtain a coating solution A-4 for a non-laminate layer.

An image-recorded medium 4 and an information recording medium 4 are produced in the same manner as in Example A1, except that a laminate film 4 for electrophotography obtained by using the coating solution A-4 for a non-laminate layer in place of the coating solution A-1 for a non-laminate layer to form a non-laminate layer with a thickness t4 of 0.3 μm (t4 satisfies the inequality (2)) is used.

The surface of the non-laminate layer of the laminate film 4 for electrophotography is observed using an optical microscope in the same manner as in Example A1 to find that the fine particles are not dropped out or embedded and no aggregation of the fine particles takes place.

Further, the number n4 (the average value of 10 sheets) of the fine particles existing in an area of 100 μm×100 μm on the non-laminate layer surface is 2.6 particles/(100 μm)², satisfying the inequality (3).

The evaluation results for the laminate film 4 for electrophotography and the information recording medium 4 evaluated by the same manner as in Example A1 are shown in Table 1.

Example A5

Preparation of Coating Solution A-5 for Non-Laminate Layer 20 parts of polyester resin (Foret FF-4M, solid matter 30% by weight in a methyl ethyl ketone solution; manufactured by Soken Chemical & Engineering Co., Ltd.), 0.3 parts of silicone resin fine particles (Tospearl 145, volume average particle diameter R5: 4.5 μm, R5 satisfies the inequality (1); manufactured by GE Toshiba Silicone Co., Ltd.), and 0.15 parts of a surfactant (Elegan 264 WAX, manufactured by Nippon Oil & Fats Co., Ltd.) are added to 130 parts of a liquid mixture of cyclohexanone and methyl ethyl ketone at a weight ratio of 10:90 and sufficiently stirred to obtain a coating solution A-5 for a non-laminate layer.

An image-recorded medium 5 and an information recording medium 5 are produced in the same manner as in Example A1, except that a laminate film 5 for electrophotography obtained by using the coating solution A-5 for a non-laminate layer in place of the coating solution A-1 for a non-laminate layer to form a non-laminate layer with a thickness t5 of 2 μm (t5 satisfies the inequality (2)) is used.

The surface of the non-laminate layer of the laminate film 5 for electrophotography is observed using an optical microscope in the same manner as in Example A1 to find that the fine particles are not dropped out or embedded and no aggregation of the fine particles takes place.

Further, the number n5 (the average value of 10 sheets) of the fine particles existing in an area of 100 μm×100 μm on the non-laminate layer surface is 3 particles/(100 μm)², satisfying the inequality (3).

The evaluation results for the laminate film 5 for electrophotography and the information recording medium 5 evaluated by the same manner as in Example A1 are shown in Table 1.

Example A6

Preparation of Coating Solution A-6 for Non-Laminate Layer 20 parts of polyester resin (Foret FF-4M, solid matter 30% by weight in a methyl ethyl ketone solution; manufactured by Soken Chemical & Engineering Co., Ltd.), 3 parts of crosslinked type acrylic fine particles (MX 500, volume average particle diameter R6: 5 μm, R6 satisfies the inequality (1); manufactured by Soken Chemical & Engineering Co., Ltd.), and 0.3 parts of a surfactant (Elegan 264 WAX, manufactured by Nippon Oil & Fats Co., Ltd.) are added to 180 parts of a liquid mixture of cyclohexanone and methyl ethyl ketone at a weight ratio of 10:90 and sufficiently stirred to obtain a coating solution A-6 for a non-laminate layer.

An image-recorded medium 6 and an information recording medium 6 are produced in the same manner as in Example A1, except that a laminate film 6 for electrophotography obtained by using the coating solution A-6 for a non-laminate layer in place of the coating solution A-1 for a non-laminate layer to form a non-laminate layer with a thickness t6 of 0.1 μm (t6 satisfies the inequality (2)) is used.

The surface of the non-laminate layer of the laminate film 6 for electrophotography is observed using an optical microscope in the same manner as in Example A1 to find that the fine particles are not embedded and no aggregation of the fine particles takes place, but 30% of the fine particles are dropped out.

Further, the number n6 (the average value of 10 sheets) of the fine particles existing in an area of 100 μm×100 μm on the non-laminate layer surface is 1.5 particles/(100 m)², satisfying the inequality (3).

The evaluation results for the laminate film 6 for electrophotography and the information recording medium 6 evaluated by the same manner as in Example A1 are shown in Table 1.

Example A7

Preparation of Coating Solution A-7 for Non-Laminate Layer 20 parts of polyester resin (Foret FF-4M, solid matter 30% by weight in a methyl ethyl ketone solution; manufactured by Soken Chemical & Engineering Co., Ltd.), 0.12 parts of crosslinked type acrylic fine particles (MX 500, volume average particle diameter R7: 5 μm, R7 satisfies the inequality (1); manufactured by Soken Chemical & Engineering Co., Ltd.), and 0.3 parts of a surfactant (Elegan 264 WAX, manufactured by Nippon Oil & Fats Co., Ltd.) are added to 30 parts of a liquid mixture of cyclohexanone and methyl ethyl ketone at a weight ratio of 10:90 and sufficiently stirred to obtain a coating solution A-7 for a non-laminate layer.

An image-recorded medium 7 and an information recording medium 7 are produced in the same manner as in Example A1, except that a laminate film 7 for electrophotography obtained by using the coating solution A-7 for a non-laminate layer in place of the coating solution A-1 for a non-laminate layer to form a non-laminate layer with a thickness t7 of 4.5 µm (t7 satisfies the inequality (2)) is used.

The surface of the non-laminate layer of the laminate film 7 for electrophotography is observed using an optical microscope in the same manner as in Example A1 to find that the fine particles are not dropped out or embedded and no aggregation of the fine particles takes place.

Further, the number n7 (the average value of 10 sheets) of the fine particles existing in an area of 100 µm×100 µm on the non-laminate layer surface is 2.5 particles/$(100\ \mu m)^2$, satisfying the inequality (3).

The evaluation results for the laminate film 7 for electrophotography and the information recording medium 7 evaluated by the same manner as in Example A1 are shown in Table 1.

Comparative Example A1

Preparation of Coating Solution A'-1 for Non-Laminate Layer 20 parts of polyester resin (Foret FF-4M, solid matter 30% by weight in a methyl ethyl ketone solution; manufactured by Soken Chemical & Engineering Co., Ltd.), 0.06 parts of silicone resin fine particles (Tospearl 105, volume average particle diameter R'1: 0.5 µm, R'1 does not satisfy the inequality (1); manufactured by GE Toshiba Silicone Co., Ltd.), and 0.3 parts of a surfactant (Elegan 264 WAX, manufactured by Nippon Oil & Fats Co., Ltd.) are added to 280 parts of a liquid mixture of cyclohexanone and methyl ethyl ketone at a weight ratio of 10:90 and sufficiently stirred to obtain a coating solution A'-1 for a non-laminate layer.

An image-recorded medium 1' and an information recording medium 1' are produced in the same manner as in Example A1, except that a laminate film 1' for electrophotography obtained by using the coating solution A'-1 for a non-laminate layer in place of the coating solution A-1 for a non-laminate layer to form a non-laminate layer with a thickness t'1 of 0.05 µm (t'1 does not satisfy the inequality (2)) is used.

The surface of the non-laminate layer of the laminate film 1' for electrophotography is observed using an optical microscope in the same manner as in Example A1 to find that although the fine particles are not embedded and no aggregation of the fine particles takes place, 20% of the fine particles are dropped out.

Further, the number n'1 (the average value of 10 sheets) of the fine particles existing in an area of 100 µm×100 µm on the non-laminate layer surface is 12.8 particles/$(100\ \mu m)^2$, not satisfying the inequality (3).

The evaluation results for the laminate film 1' for electrophotography and the information recording medium 1' evaluated by the same manner as in Example A1 are shown in Table 1.

Comparative Example A2

Preparation of Coating Solution A'-2 for Non-Laminate Layer 20 parts of Polyester resin (Foret FF-4M, solid matter 30% by weight in a methyl ethyl ketone solution; manufactured by Soken Chemical & Engineering Co., Ltd.), 0.03 parts of silicone resin fine particles (Tospearl 105, volume average particle diameter R'2: 0.5 µm, R'2 does not satisfy the inequality (1); manufactured by GE Toshiba Silicone Co., Ltd.), and 0.3 parts of a surfactant (Elegan 264 WAX, manufactured by Nippon Oil & Fats Co., Ltd.) are added to 80 parts of a liquid mixture of cyclohexanone and methyl ethyl ketone at a weight ratio of 10:90 and sufficiently stirred to obtain a coating solution A'-2 for a non-laminate layer.

An image-recorded medium 2' and an information recording medium 2' are produced in the same manner as in Example A1, except that a laminate film 2' for electrophotography obtained by using the coating solution A'-2 for a non-laminate layer in place of the coating solution A-1 for a non-laminate layer to form a non-laminate layer with a thickness t'2 of 1 µm (t'2 does not satisfy the inequality (2)) is used.

The surface of the non-laminate layer of the laminate film 2' for electrophotography is observed using an optical microscope in the same manner as in Example A1 to find that although the fine particles are not dropped out, the fine particles are aggregated and embedded.

Further, the number n'2 (the average value of 10 sheets) of the fine particles existing in an area of 100 µm×100 µm on the non-laminate layer surface is 80 particles/$(100\ \mu m)^2$, not satisfying the inequality (3).

The evaluation results for the laminate film 2' for electrophotography and the information recording medium 2' evaluated by the same manner as in Example A1 are shown in Table 1.

Comparative Example A3

Preparation of Coating Solution A'-3 for Non-Laminate Layer)

20 parts of polyester resin (Foret FF-4M, solid matter 30% by weight in a methyl ethyl ketone solution; manufactured by Soken Chemical & Engineering Co., Ltd.), 3 parts of crosslinked acrylic fine particles (MX 800, volume average particle diameter R'3: 8 µm, R'3 does not satisfy the inequality (1); manufactured by Soken Chemical & Engineering Co., Ltd.), and 0.3 parts of a surfactant (Elegan 264 WAX, manufactured by Nippon Oil & Fats Co., Ltd.) are added to 280 parts of a liquid mixture of cyclohexanone and methyl ethyl ketone at a weight ratio of 10:90 and sufficiently stirred to obtain a coating solution A'-3 for a non-laminate layer.

An image-recorded medium 3' and an information recording medium 3' are produced in the same manner as in Example A1, except that a laminate film 3' for electrophotography obtained by using the coating solution A'-3 for a non-laminate layer in place of the coating solution A-1 for a non-laminate layer to form a non-laminate layer with a thickness t'3 of 0.05 µm (t'3 does not satisfy the inequality (2)) is used.

The surface of the non-laminate layer of the laminate film 3' for electrophotography is observed using an optical microscope in the same manner as in Example A1 to find that although the fine particles are not embedded and no aggregation of the fine particles takes place, 70% of the fine particles are dropped out.

Further, the number n'3 (the average value of 10 sheets) of the fine particles existing in an area of 100 μm×100 μm on the non-laminate layer surface is 0.2 particles/(100 μm)$^2$, not satisfying the inequality (3).

The evaluation results for the laminate film 3' for electrophotography and the information recording medium 3' evaluated by the same manner as in Example A1 are shown in Table 1.

Comparative Example A4

Preparation of Coating Solution A'-4 for Non-Laminate Layer 20 parts of polyester resin (Foret FF-4M, solid matter 30% by weight in a methyl ethyl ketone solution; manufactured by Soken Chemical & Engineering Co., Ltd.), 0.05 parts of crosslinked acrylic fine particles (MX 800, volume average particle diameter R'4: 8 μm, R'4 does not satisfy the inequality (1); manufactured by Soken Chemical & Engineering Co., Ltd.), and 0.3 parts of a surfactant (Elegan 264 WAX, manufactured by Nippon Oil & Fats Co., Ltd.) are added to 30 parts of a liquid mixture of cyclohexanone and methyl ethyl ketone at a weight ratio of 10:90 and sufficiently stirred to obtain a coating solution A'-4 for a non-laminate layer.

An image-recorded medium 4' and an information recording medium 4' are produced in the same manner as in Example A1, except that a laminate film 4' for electrophotography obtained by using the coating solution A'-4 for a non-laminate layer in place of the coating solution A-1 for a non-laminate layer to form a non-laminate layer with a thickness t'4 of 10 μm (t'4 does not satisfy the inequality (2)) is used.

The surface of the non-laminate layer of the laminate film 4' for electrophotography is observed using an optical microscope in the same manner as in Example A1 to find that although the fine particles are not dropped out or aggregated, the fine particles are embedded.

Further, the number n'4 (the average value of 10 sheets) of the fine particles existing in an area of 100 μm×100 μm on the non-laminate layer surface is 0.7 particles/(100 μM)$^2$, not satisfying the inequality (3).

The evaluation results for the laminate film 4' for electrophotography and the information recording medium 4' evaluated by the same manner as in Example A1 are shown in Table 1.

Example A8

An image-recorded medium 8 and an information recording medium 8 are produced in the same manner as in Example A1, except that a laminate film 8 for electrophotography obtained by using the coating solution A-7 for a non-laminate layer in place of the coating solution A-1 for a non-laminate layer to form a non-laminate layer with a thickness t8 of 1.0 μm (t8 satisfies the inequality (2)) is used.

The surface of the non-laminate layer of the laminate film 8 for electrophotography is observed using an optical microscope in the same manner as in Example A1 to find that although the fine particles are not embedded and aggregated, 20% of the fine particles are dropped out.

Further, the number n8 (the average value of 10 sheets) of the fine particles existing in an area of 100 μm×100 μm on the non-laminate layer surface is 2.0 particles/(100 μM)$^2$, satisfying the inequality (3).

The evaluation results for the laminate film 8 for electrophotography and the information recording medium 8 evaluated by the same manner as in Example A1 are shown in Table 1.

Example A9

Preparation of Coating Solution A-9 for Non-Laminate Layer 20 parts of polyester resin (Foret FF-4M, solid matter 30% by weight in a methyl ethyl ketone solution; manufactured by Soken Chemical & Engineering Co., Ltd.), 0.24 parts of crosslinked type acrylic fine particles (MX 180, volume average particle diameter R9: 1.8 μm, R9 satisfies the inequality (1); manufactured by Soken Chemical & Engineering Co., Ltd.), and 0.3 parts of a surfactant (Elegan 264 WAX, manufactured by Nippon Oil & Fats Co., Ltd.) are added to 80 parts of a liquid mixture of cyclohexanone and methyl ethyl ketone at a weight ratio of 10:90 and sufficiently stirred to obtain a coating solution A-9 for a non-laminate layer.

An image-recorded medium 9 and an information recording medium 9 are produced in the same manner as in Example A1, except that a laminate film 9 for electrophotography obtained by using the coating solution A-9 for a non-laminate layer in place of the coating solution A-1 for a non-laminate layer to form a non-laminate layer with a thickness t9 of 1.4 μm (t9 satisfies the inequality (2)) is used.

The surface of the non-laminate layer of the laminate film 9 for electrophotography is observed using an optical microscope in the same manner as in Example A1 to find that the fine particles are not dropped out or embedded and no aggregation of the fine particles takes place.

Further, the number n9 (the average value of 10 sheets) of the fine particles existing in an area of 100 μm×100 μm on the non-laminate layer surface is 25 particles/(100 μm)$^2$, satisfying the inequality (3). However since n (=25) exceeds 35/R (=19.4), the non-laminate layer becomes white and the image of the information recording medium 9 appears cloudy.

The evaluation results for the laminate film 9 for electrophotography and the information recording medium 9 evaluated by the same manner as in Example A1 are shown in Table 1.

TABLE 1

| | Laminate film for electrophotography | | | |
| --- | --- | --- | --- | --- |
| | Average particle diameter R (μm) of fine | Thickness t (μm) of non-laminate | Dropping out/embedding of | Average number n of fine particles [particles/ |

TABLE 1-continued

|  | particles | $1.5 \leq R \leq 5$ | layer | $0.1 \leq t < R$ | fine particles | $(100 \mu m)^2]$ |
|---|---|---|---|---|---|---|
| Example A1 | 1.5 | satisfied | 0.1 | satisfied | A/A | 5.0 |
| Example A2 | 1.5 | satisfied | 1.0 | satisfied | A/A | 23.0 |
| Example A3 | 3.0 | satisfied | 0.15 | satisfied | A/A | 5.0 |
| Example A4 | 3.0 | satisfied | 0.3 | satisfied | A/A | 2.6 |
| Example A5 | 4.5 | satisfied | 2.0 | satisfied | A/A | 3.0 |
| Example A6 | 5.0 | satisfied | 0.1 | satisfied | B/A | 1.5 |
| Example A7 | 5.0 | satisfied | 4.5 | satisfied | A/A | 2.5 |
| Example A8 | 5.0 | satisfied | 1.0 | satisfied | B/A | 2.0 |
| Example A9 | 1.8 | satisfied | 1.4 | satisfied | A/A | 25 |
| Comparative Example A1 | 0.5 | not satisfied | 0.05 | not satisfied | B/A | 12.8 |
| Comparative Example A2 | 0.5 | not satisfied | 1.0 | not satisfied | A/B | 80.0 |
| Comparative Example A3 | 8.0 | not satisfied | 0.05 | not satisfied | C/A | 0.2 |
| Comparative Example A4 | 8.0 | not satisfied | 10.0 | not satisfied | A/B | 0.7 |

|  | | Information recording medium | | | | |
|---|---|---|---|---|---|---|
|  | 7/R-35/R ($\mu$m) | $7/R \leq n$ | R-t($\mu$m) | Aggregation of fine particle | Air accumulation traces on surface | Finished glossiness (%) (75° specular reflectivity) |
| Example A1 | 4.6-23.3 | satisfied | 1.4 | A | A | A |
| Example A2 | 4.6-23.3 | satisfied | 0.5 | A | A | B |
| Example A3 | 2.3-11.6 | satisfied | 2.9 | A | A | A |
| Example A4 | 2.3-11.6 | satisfied | 2.7 | A | B | B |
| Example A5 | 1.5-7.7 | satisfied | 2.5 | A | A | C |
| Example A6 | 1.4-7 | satisfied | 4.9 | A | A | A |
| Example A7 | 1.4-7 | satisfied | 0.5 | A | B | C |
| Example A8 | 1.4-7 | satisfied | 4.0 | A | A | C |
| Example A9 | 3.9-19.4 | satisfied | 0.4 | A | B | C |
| Comparative Example A1 | 14-70 | not satisfied | 0.5 | B | C | A |
| Comparative Example A2 | 14-70 | satisfied | −0.5 | B | C | B |
| Comparative Example A3 | 0.8-4.3 | not satisfied | 8.0 | A | C | A |
| Comparative Example A4 | 0.8-4.3 | not satisfied | −2.0 | A | C | C |

—Evaluation of Laminate Film for Electrophotography and Information Recording Medium of the Second Embodiment Produced by Using the Same—

Example B1

A laminate film for electrophotography (a laminate film 1 for electrophotography) and an information recording medium using the laminate film are produced by the following procedures.

<Production of Laminate Film for Electrophotography>

(Preparation of Coating Solution A-1 for Non-Laminate Layer 20 parts of polyester resin (Foret 4M, solid matter 30% by weight, manufactured by Soken Chemical & Engineering Co., Ltd.), 0.6 parts of crosslinked type acrylic fine particles (MX 300, volume average particle diameter R1: 3 µm, R1 satisfies the inequality (1); manufactured by Soken Chemical & Engineering Co., Ltd.), and 0.3 parts of a surfactant (Elegan 264 WAX, manufactured by Nippon Oil & Fats Co., Ltd.) are added to 80 parts of a liquid mixture of cyclohexanone and methyl ethyl ketone at a weight ratio of 10:90 and sufficiently stirred to obtain a coating solution A-1 for a non-laminate layer.

(Preparation of Coating Solution 1 for Releasing Layer)

20 parts of a silicone hard coat agent containing an organic silane condensate, a melamine resin, and an alkyd resin (SHC 900, solid matter 30% by weight; manufactured by GE Toshiba Silicone Co., Ltd.) is added to 30 parts of a liquid mixture of cyclohexanone and methyl ethyl ketone at a weight ratio of 10:90 and sufficiently stirred to obtain a coating solution 1 for a releasing layer.

(Preparation of Coating Solution B-1 for Laminate Layer)

20 parts of polyester resin (Vylon 200; manufactured by Toyobo Co., Ltd.), 1 part of crosslinked type acrylic fine particles (MX 500, volume average particle diameter: 5 µm; manufactured by Soken Chemical & Engineering Co., Ltd.), and 0.6 parts of a surfactant (Elegan 264 WAX, manufactured by Nippon Oil & Fats Co., Ltd.) are added to 80 parts of a liquid mixture of cyclohexanone and methyl ethyl ketone at a weight ratio of 10:90 and sufficiently stirred to obtain a coating solution B-1 for a laminate layer.

(Production of Laminate Film 1 for Electrophotography)

As a substrate, a PET film (Lumirror 100T60; thickness: 100 µm; manufactured by Toray Industries Inc.) is used, and one surface of the substrate is coated with the coating solution A-1 for a non-laminate layer by a wire bar and dried at 120°

C. for 30 seconds to form a laminate layer with a thickness t1 of 0.2 µm (t1 satisfies the inequality (2)). Then, the above-mentioned coating solution 1 for a releasing layer is applied to the other surface (an untreated surface) of the substrate by a wire bar in the same manner and dried at 120° C. for 30 seconds to form a 1 µm-thick releasing layer, onto which releasing layer the coating solution B-1 for a laminate layer is applied by a wire bar and dried at 120° C. for 60 seconds to form a laminate layer with a thickness of 10 µm. After that, the resulting substrate is cut into A4 size (210 mm×297 mm) to obtain a laminate film 1 for electrophotography.

The surface of the non-laminate layer of this laminate film 1 for electrophotography is observed using an optical microscope in the same manner as in Example A1 to find that the fine particles are not dropped out or embedded and no aggregation of the fine particles takes place.

Further, the number n1 (the average value of 10 sheets) of the fine particles existing in an area of 100 µm×100 µm on the non-laminate layer surface is 3.5 particles/(100 µm)$^2$, satisfying the inequality (3).

The evaluation results for the laminate film 1 for electrophotography and the after-mentioned information recording medium 1 evaluated by the same manner as in Example A1 are shown in Table 2.

(Production of Image-Recorded Medium)

Next, an image-recorded medium 1-U of A4 size having formed thereon 9 images (card size) which are color mirror images including solid images, and an image-recorded medium 1-D similarly having formed thereon 9 images which are mirror images of only letter information are produced by using a modified (modified so as to control the surface temperature of the laminate film at fixation to be in a range of 95 to 100° C.) DocuColor 1255 CP color copying machine manufactured by Fuji Xerox Co., Ltd. to form the above-described images on the laminate layer surface of the above-mentioned laminate film 1.

<Production of Core Substrate Sheet for Card>

(Preparation of Core Substrate Sheet 1 for Card)

A white PETG whole sheet (Diafix WHI, total thickness: 760 µm, manufactured by Mitsubishi Plastics INC.) is cut into A4 size (210 mm×297 mm) to produce a core substrate sheet 1 for a card.

<Production of Information Recording Medium>

The image-formed surface of the above-mentioned image recorded medium 1-U and the image-formed surface of the above-mentioned image recorded medium 1-D are respectively laid on one surface and the other surface of the core substrate sheet 1 for a card such that positions of the respective four corners are matched, and the three-substrate layered product is sandwiched between a pair of press plates made of a SUS steel and having specularly polished surfaces for pressing.

The obtained layered product wherein the above fitting and layering have been carried out (the press plate/the image recorded medium 1-U/the core substrate sheet 1 for a card/the image recorded medium 1-D/the press plate) is heat pressed with a temperature of the upper and lower press plates set to 110° C. at 10 kgf/cm$^2$ for 30 seconds at atmospheric pressure to carry out lamination and is cooled to room temperature, and then the press plates are removed to obtain a layered product having the same layered structure as that of the information recording medium of the first embodiment.

Air accumulation traces (air accumulation traces like dimple patterns before a separation process) on both surfaces of the layered product are evaluated in the same manner as in Example A1.

Next, an information recording medium 1 (an information recording medium of the second embodiment) is obtained by separating interfaces between the laminate layers and the respective substrates of the image-recorded medium 1-U and the image-recorded medium 1-D constituting the layered product.

The above-mentioned process is repeated ten times to obtain a total of 10 sheets of the information recording medium 1.

<Evaluation of Air Accumulation Traces on the Surface of Information Recording Medium (Obtained after the Separation Process)>

With respect to the ten sheets of the information recording medium 1, air accumulation traces (air accumulation traces like dimple patterns) on both surfaces of the information recording medium are evaluated according to the following standards.

A: the average number of air accumulation traces is zero by eye observation of the front and the back surfaces of each of the ten sheets;

B: the average number of air accumulation traces is more than 0 but is less than 3 by eye observation of the front and the back surfaces of each of the ten sheets; and C: the average number of air accumulation traces is 3 or more by eye observation of the front and the back surfaces of each of the ten sheets.

<Evaluation of Finished Glossiness of Information Recording Medium (Obtained after the Separation Process)>

With respect to the ten sheets of the information recording medium 1, the glossiness is evaluated according to the following standards. The glossiness is measured by measuring 75° specular reflectivity by a glossmeter (MODEL GM-26D FOR 75°, manufactured by Murakami Color Research Laboratory Co., Ltd.).

A: the average value of 75° specular reflectivity is 95% or more for glossiness measurement at nine points (center points of respective cards of 9 face-imposition) on the front and back surfaces of the ten sheets;

B: the average value of 75° specular reflectivity is 40% or more but less than 95% for glossiness measurement at nine points (center points of respective cards of 9 face-imposition) on the front and back surfaces of the ten sheets; and C: the average value of 75° specular reflectivity is less than 40% for glossiness measurement at nine points (center points of respective cards of 9 face-imposition) on the front and back surfaces of the ten sheets.

The above-mentioned respective evaluation results are shown in Table 2.

Comparative Example B1

Preparation of Coating Solution A'-1 for Non-Laminate Layer 20 parts of polyester resin (Foret 4M, solid matter 30% by weight, manufactured by Soken Chemical & Engineering Co., Ltd.), 0.06 parts of crosslinked type acrylic fine particles (MX 1000, volume average particle diameter R'1: 10 µm, R'1 does not satisfy the inequality (1); manufactured by Soken Chemical & Engineering Co., Ltd.), and 0.3 parts of a surfactant (Elegan 264 WAX, manufactured by Nippon Oil & Fats Co., Ltd.) are added to 130 parts of a liquid mixture of cyclohexanone and methyl ethyl ketone at a weight ratio of 10:90 and sufficiently stirred to obtain a coating solution A'-1 for a non-laminate layer.

An image-recorded medium 1' and an information recording medium 1' are produced in the same manner as in Example B1, except that a laminate film 1' for electrophotography obtained by using the coating solution A'-1 for a non-laminate layer in place of the coating solution A-1 for a non-laminate layer to form a non-laminate layer with a thickness t'1 of 2 μm (t'1 satisfies the inequality (2)) is used.

The surface of the non-laminate layer of the laminate film 1' for electrophotography is observed using an optical microscope in the same manner as in Example B1 to find that although the fine particles are not dropped out, the fine particles are aggregated and embedded.

Further, the number n'1 (the average value of 10 sheets) of the fine particles existing in an area of 100 μm×100 μm on the non-laminate layer surface is 0.7 particles/(100 μm)$^2$, not satisfying the inequality (3).

The evaluation results for the laminate film 1' for electrophotography and the information recording medium 1' evaluated by the same manner as in Example B1 are shown in Table 2.

medium and the at least one surface of the core substrate sheet for a card by heat pressure bonding, wherein the image-recorded medium comprises a substrate, the laminate layer formed on one surface of the substrate, and a non-laminate layer formed on the other surface of the substrate, the toner image being formed on the surface of the laminate layer by use of an electrophotographic method, and wherein the non-laminate layer contains at least a resin and fine particles and satisfies the following inequalities (5) to (7):

$$1.5 \leq R \leq 5; \quad \text{inequality (5)}$$

$$0.1 \leq t < R; \text{ and} \quad \text{inequality (6)}$$

$$7/R \leq n, \quad \text{inequality (7)}$$

wherein R represents a volume average particle diameter (μm) of the fine particles; t represents a thickness (μm) of the

TABLE 2

| | Laminate film for electrophotography | | | | | | | | |
|---|---|---|---|---|---|---|---|---|---|
| | Average particle diameter R (μm) of fine particles | $1.5 \leq R \leq 5$ | Thickness t (μm) of non-laminate layer | $0.1 \leq t \leq R$ | Dropping out/embedding of fine particles | Average number n of fine particles [particles/(100 μm)$^2$] | 7/R-35/R (μm) | $7/R \leq n$ | Aggregation of fine particle |
| Example B1 | 3.0 | satisfied | 0.2 | satisfied | A/A | 3.5 | 2.3-11.6 | satisfied | A |
| Comparative Example B'1 | 10.0 | not satisfied | 2.0 | satisfied | A/A | 0.7 | 0.8-3.5 | not satisfied | A |

| | Layered product after lamination process and before separation process air accumulation traces on surface | Information recording medium (obtained through separation process) | |
|---|---|---|---|
| | | Air accumulation traces on surface | Finished glossiness (%) (75° specular reflectivity) |
| Example B1 | B | B | B |
| Comparative Example B'1 | C | C | A |

As described above, in the case of producing an information recording medium by laminating a laminate film for electrophotography in which an image is recorded at the laminate surface side and a core substrate sheet for a card at approximately atmospheric pressure within a short time, the invention provides a laminate film for electrophotography by which formation of traces of air accumulation like dimple patterns on a non-laminate surface can be prevented, an information recording medium using the same and excellent in the finished image (particularly gloss quality) and productivity, and a method for manufacturing such an information recording medium.

What is claimed is:

1. An information recording medium comprising a core substrate sheet for a card and a laminate layer bonded to at least one surface of the core substrate sheet for a card, a toner image being formed on a surface of the laminate layer at the core substrate sheet for a card side thereof, wherein the information recording medium is produced at least through a lamination process of laminating the surface of the laminate layer of an image-recorded non-laminate layer; and n represents the number of the fine particles contained in the non-laminate layer per 10,000 square μm in the substrate plane direction (particles/(100 μm)$^2$).

2. The information recording medium of claim 1 comprising the core substrate sheet for a card and the image-recorded medium bonded to the at least one surface of the core substrate sheet for a card.

3. The information recording medium of claim 1, wherein the surface of the substrate, on which the laminate layer is formed, has a releasing property, wherein the information recording medium is produced through the lamination process and a separation process, and wherein the separation process is a process of separating a layered product, which comprises the core substrate sheet for a card and the image-recorded medium bonded to the at least one surface of the core substrate sheet for a card, at an interface between the substrate and the laminate layer, the layered product being obtained by the lamination process.

4. The information recording medium of claim 1, wherein the laminate layer is transparent, and the toner image is formed on the surface of the laminate layer in the form of a mirror image.

5. The information recording medium of claim 1, wherein the core substrate sheet for a card contains an information chip on which information can be read out and/or written in by using at least one means selected from electric means, magnetic means, or optical means.

6. A method for producing an information recording medium, comprising at least a lamination process of laminating a surface of a laminate layer of an image-recorded medium and at least one surface of a core substrate sheet for a card by heat pressure bonding,
wherein the image-recorded medium is obtained by forming a toner image on the surface of the laminate layer of a laminate film for electrophotography by use of an electrophotographic method, the laminate film for electrophotography comprising a substrate, the laminate layer formed on one surface of the substrate, and a non-laminate layer formed on the other surface of the substrate, and
wherein the non-laminate layer contains at least a resin and fine particles and satisfies the following inequalities (8) to (10):

$$1.5 \leq R \leq 5;\qquad\text{inequality (8)}$$

$$0.1 \leq t < R; \text{ and}\qquad\text{inequality (9)}$$

$$7/R \leq n,\qquad\text{inequality (10)}$$

wherein R represents a volume average particle diameter (μm) of the fine particles; t represents a thickness (μm) of the non-laminate layer; and n represents the number of the fine particles contained in the non-laminate layer per 10,000 square μm in the substrate plane direction (particles/(100 μm)$^2$).

7. The method of claim 6, wherein the information recording medium comprises the core substrate sheet for a card and the image-recorded medium bonded to the at least one surface of the core substrate sheet for a card.

8. The method of claim 6, wherein the surface of the substrate, on which the laminate layer is formed, has a releasing property,
wherein the information recording medium is produced through the lamination process and a separation process,
wherein the separation process is a process of separating a layered product, which comprises the core substrate sheet for a card and the image-recorded medium bonded to the at least one surface of the core substrate sheet for a card, at an interface between the substrate and the laminate layer, the layered product being obtained by the lamination process, and
wherein the information recording medium comprises the core substrate sheet for a card and the laminate layer bonded to the at least one surface of the core substrate sheet for a card, the toner image being formed on the surface of the laminate layer at the core substrate sheet for a card side thereof.

9. The method of claim 6, wherein the time taken for the heat pressure bonding is 5 minutes or less.

10. The method of claim 6, wherein an adhesive layer is formed on the surface of the core substrate sheet for a card, on which the surface of the laminate layer of the image-recorded medium is laminated.

11. The method of claim 7, wherein the heat pressure bonding is carried out at atmospheric pressure.

* * * * *